(12) United States Patent
Wang et al.

(10) Patent No.: US 12,373,297 B2
(45) Date of Patent: *Jul. 29, 2025

(54) ADAPTIVE THROTTLING IN A UNIVERSAL BACKUP HOST

(71) Applicant: Rubrik, Inc., Palo Alto, CA (US)

(72) Inventors: Haihong Wang, Fremont, CA (US); Gopikrishnan Aditya Suresh, Culver City, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,241

(22) Filed: Apr. 26, 2024

(65) Prior Publication Data

US 2024/0281334 A1 Aug. 22, 2024

Related U.S. Application Data

(63) Continuation of application No. 17/746,184, filed on May 17, 2022, now Pat. No. 12,013,761, which is a continuation of application No. 16/879,420, filed on May 20, 2020, now Pat. No. 11,366,721.

(51) Int. Cl.
| | |
|---|---|
| *G06F 11/14* | (2006.01) |
| *G06F 9/30* | (2018.01) |
| *G06F 9/50* | (2006.01) |
| *G06F 16/11* | (2019.01) |

(52) U.S. Cl.
CPC ........ *G06F 11/1435* (2013.01); *G06F 9/3009* (2013.01); *G06F 9/5027* (2013.01); *G06F 11/1461* (2013.01); *G06F 11/1464* (2013.01); *G06F 11/1469* (2013.01); *G06F 16/128* (2019.01); *G06F 2209/5011* (2013.01); *G06F 2209/5018* (2013.01)

(58) Field of Classification Search
None
See application file for complete search history.

(56) References Cited

U.S. PATENT DOCUMENTS

| | | | | |
|---|---|---|---|---|
| 9,208,032 | B1* | 12/2015 | McAlister | G06F 11/1471 |
| 9,542,396 | B1* | 1/2017 | Pawar | G06F 11/1471 |
| 2005/0177777 | A1* | 8/2005 | Seaburg | G06F 11/1464 |
| | | | | 714/42 |
| 2015/0127619 | A1* | 5/2015 | Jarvis | G06F 11/1471 |
| | | | | 707/685 |

(Continued)

*Primary Examiner* — Eliyah S. Harper
(74) *Attorney, Agent, or Firm* — Holland & Hart LLP

(57) ABSTRACT

Systems and methods to throttle a universal backup host are described. The system executes a job, at a backup host, to back up a file set from a source host including fetching metadata from the source host. The system identifies a first operation set from operation sets, the operation set including a first operation. The system communicates, in parallel, requests for metadata items, over a network, to the source host, receives responses, and processes the responses by utilizing threads from a thread pool. The system generates latencies, counts the number of requests, and stores the latencies and number of requests in samples. The system aggregates the samples responsive to a timeout. The system resizes the thread pool based on the aggregating. Finally, the system backs up the file set from the source host based on the metadata.

20 Claims, 23 Drawing Sheets

(56) References Cited

U.S. PATENT DOCUMENTS

| | | | |
|---|---|---|---|
| 2016/0077925 A1* | 3/2016 | Tekade | G06F 11/1456 707/654 |
| 2019/0079928 A1* | 3/2019 | Kumar | G06F 11/1448 |
| 2021/0365324 A1 | 11/2021 | Wang et al. | |

* cited by examiner

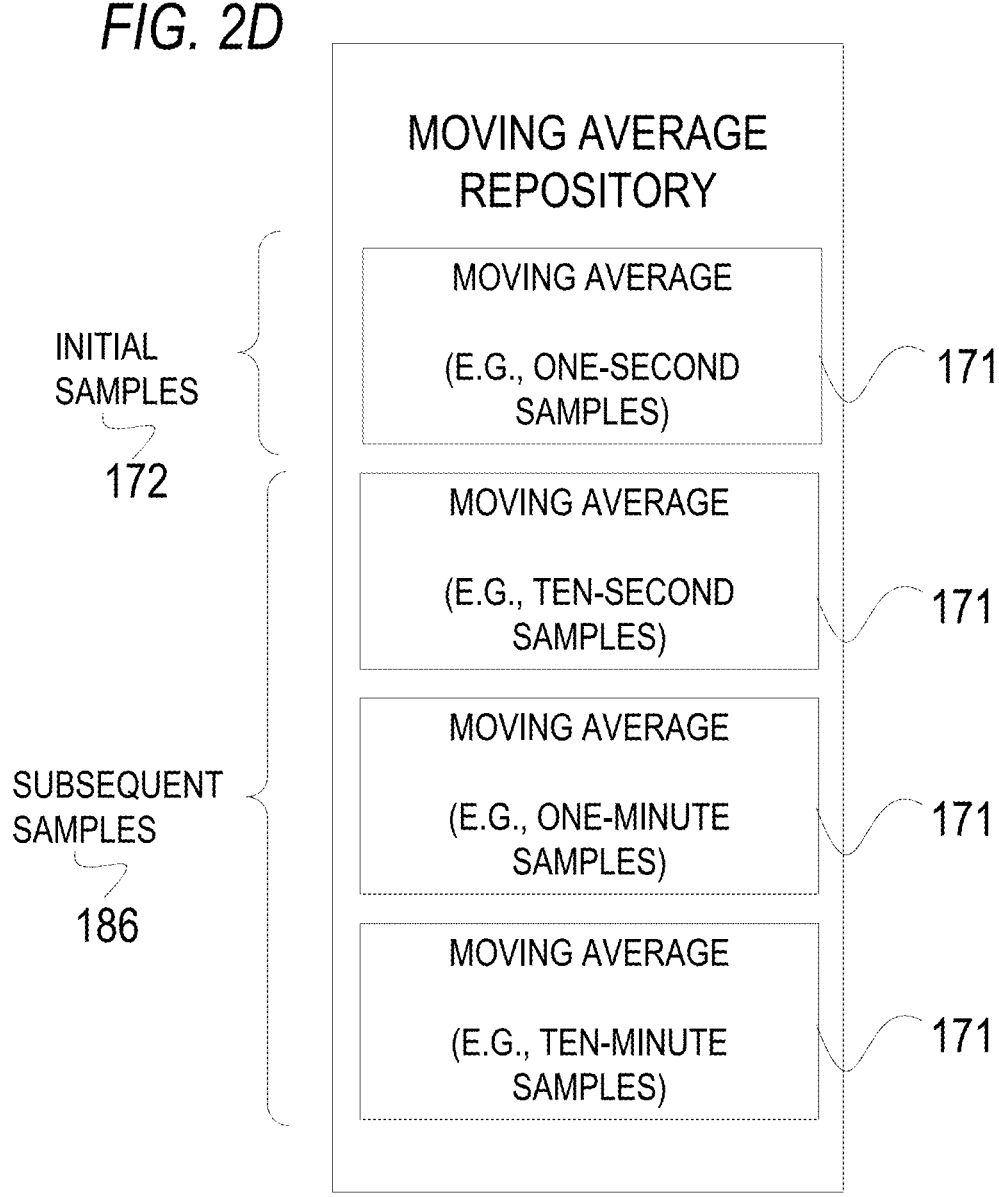

ADAPTIVE THROTTLING IN A UNIVERSAL BACKUP HOST

CLAIM OF PRIORITY

The present application for is a Continuation of U.S. patent application Ser. No. 17/746,184 by Wang et al., entitled "ADAPTIVE THROTTLING IN A UNIVERSAL BACKUP HOST" and filed May 17, 2022, which is a Continuation of U.S. patent application Ser. No. 16/879,420 by Wang et al., entitled "ADAPTIVE THROTTLING IN A UNIVERSAL BACKUP HOST" and filed May 20, 2020, each of which is assigned to the assignee hereof and expressly incorporated by reference in its entirety herein.

TECHNICAL FIELD

The disclosure relates generally to computer architecture software for a data management platform and, in some more particular aspects, to adaptive throttling in a universal backup host.

BACKGROUND

Enterprise resource planning (ERP) systems, customer resource management (CRM) systems, and other production systems require repeated recovery, testing, and analysis. Accordingly, such systems are frequently backed up. But frequent backup of production systems may take a prohibitive amount of time and/or burden the production system with processes that compete for scarce resources.

BRIEF DESCRIPTION OF THE DRAWINGS

FIG. 2D is a block diagram illustrating a moving average repository, according to an embodiment;

DETAILED DESCRIPTION

Figure 1A:
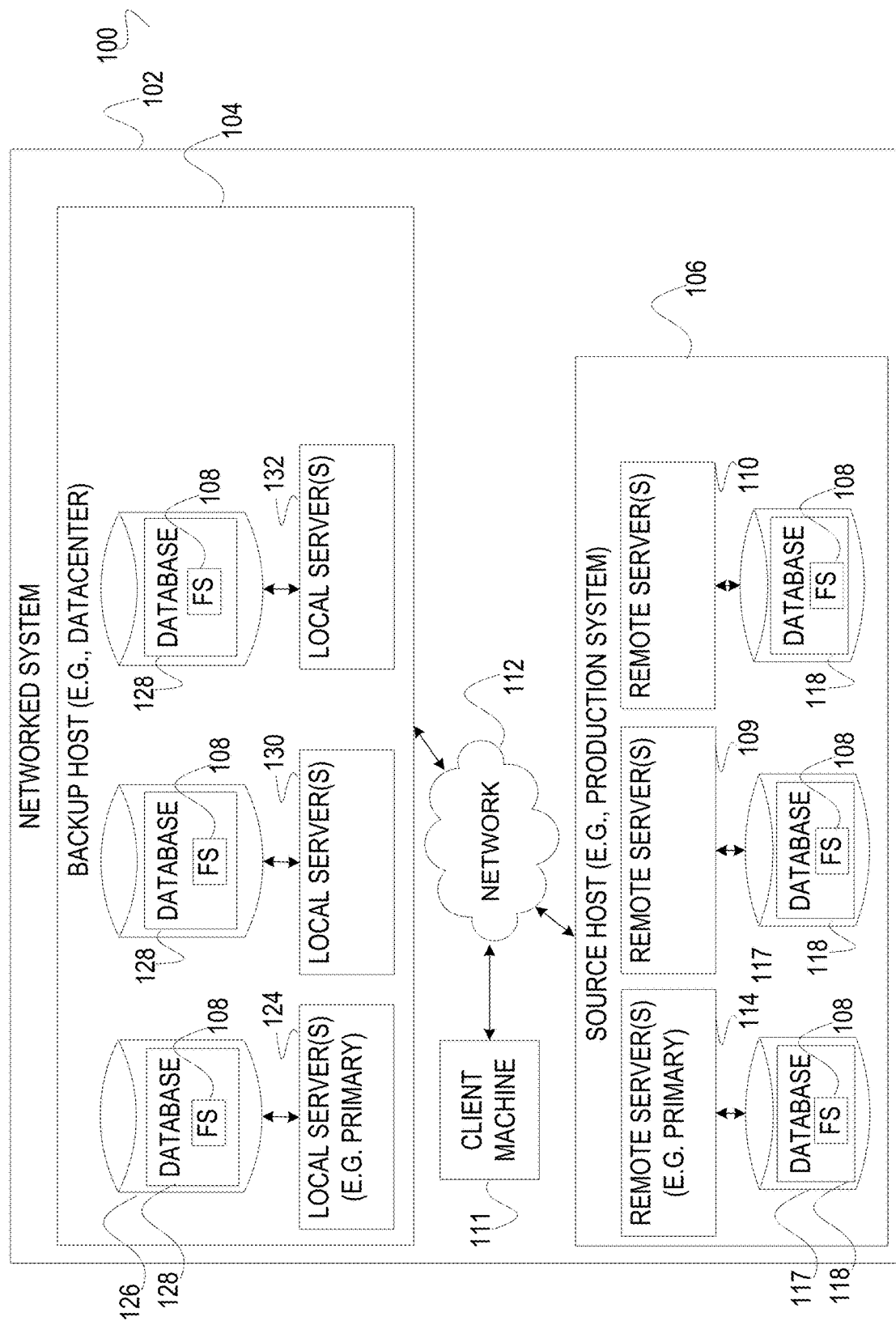
FIG. 1A is a block diagram illustrating a system, according to an embodiment, to utilize adaptive throttling.

This description is directed at three aspects of a computer architecture software for a data management platform. The first aspect is adaptive throttling in a universal backup host; the second aspect is adaptive throttling for a source host; and the third aspect is an adaptive throttling communication protocol Adaptive Throttling in a Universal Backup Host According to a first aspect of the present disclosure, a system for adaptive throttling in a universal backup host is described. The system executes a job, at a backup host. The job is for backing up a file set from a source host to the backup host. The backup host may execute the job responsive to a triggering event. For example, the triggering event may include a periodic expiration of a timeout (e.g., every hour, on the hour). The backing up of the file set includes: 1) the backup host fetching metadata from the source host; and, 2) backing up the file set from the remote host based on the metadata. The backup host begins the fetching of each metadata item from a remote server, at the source host, by identifying an operation set from multiple operation sets. The backup host identifies the operation set by identifying a file sharing protocol being utilized by the backup host and the remote servers. For example, the backup host may identify a Unix operation set by identifying the backup host and the remote server as utilizing a Network File System file sharing protocol. The backup host selects an operation for generating a metadata item from the operation set. The backup host communicates, in parallel, one or more requests for metadata items, over a network, to the source host by utilizing one or more threads from a thread pool. For example, the backup host may communicate a first and second request for metadata items, in parallel, by respectively utilizing first and second threads from a thread pool. The first request includes a first operation and the second request includes a second operation. The backup host receives responses, over the network, corresponding to the one or more requests by using the one or more threads. For example, the backup host receives a response from the source host corresponding to the first request by using the first thread. The response includes a first metadata that was generated at the source host by executing the first operation. The backup host processes the responses including the first response. For example, the backup host may process the first response by generating a first latency and storing the first latency in a sample. The backup host may compute the first latency based on the elapsed time for communicating the first request, generating the metadata item on the remote host, and receiving the first response. In addition, the backup host counts the first request by incrementing a number of requests in the sample. Responsive to a timeout (e.g., one second), the backup host aggregates samples. For example, the backup host may aggregate ten one-second samples to generate one ten-second sample. The samples include the first latency and the number of requests. The backup host resizes the thread pool based on the aggregating of the samples. Resizing the thread pool causes a throttling of the communicating of requests. For example, a backup host with a thread pool of eight may send eight requests for metadata items in parallel, but a backup host with a thread pool of four may only send four requests for metadata items in parallel. After the entirety of the metadata is retrieved, the backup host backs up the file set from the source host to the backup host. The backup host backs up the file set from the source host based on the metadata.

Adaptive Throttling for a Source Host

According to a second aspect of the present disclosure, a system for adaptive throttling for a source host is described. The system executes a job, at a backup host. The job is for backing up a file set from the source host to the backup host. The backup host may execute the job responsive to a triggering event. For example, the triggering event may include a periodic expiration of a timeout (e.g., every hour, on the hour). The backing up of the file set includes: 1) the backup host fetching metadata from the source host; and, 2) backing up the file set from the remote host based on the metadata. The backup host utilizes an operation set in accordance with a file sharing protocol that is being shared by the backup host and the source host. The backup host communicates, in parallel, one or more requests for metadata items, over a network, to the source host by utilizing one or more threads from a thread pool. For example, the backup host may communicate a first and second request for metadata items, in parallel, by respectively utilizing first and second threads from a thread pool. The first request includes a first operation and the second request includes a second operation. The backup host receives responses, over the network, corresponding to the one or more requests by using the one or more threads. For example, the backup host receives a response from the source host corresponding to the first request by using the first thread. The response includes a first metadata item that was generated, at the source host, by executing the first operation. The backup host processes the responses including the first response. For example, the backup host may process the first response by generating a first latency and storing the first latency in a sample. The backup host may compute the first latency based on the elapsed time for communicating the first request, generating the metadata item on the remote host, and receiving the first response. In addition, the backup host counts the first request by incrementing a number of requests in the sample. Responsive to a timeout (e.g., one second), the backup host aggregates samples. For example, the backup host may aggregate ten one-second samples to generate one ten-second sample. The samples include the first latency and the number of requests. The backup host resizes the thread pool based on the aggregating of the samples. Resizing the thread pool causes a throttling of the communicating of requests. For example, a backup host with a thread pool of eight may send eight requests for metadata items in parallel, but a backup host with a thread pool of four may only send four requests for metadata items in parallel. After the entirety of the metadata is retrieved, the backup host backs up the file set from the source host to the backup host. The backup host backs up the file set from the source host based on the metadata.

Adaptive Throttling Communication Protocol

According to a third aspect of the present disclosure, a system utilizing an adaptive throttling communication protocol is described. The system includes a first host requesting one or more portions of data from a second host. The first host utilizes an operation set in accordance with a file sharing protocol that is being shared by the first host and the second host. The first host communicates, in parallel, one or more requests for portions of data, over a network, to the second host by utilizing one or more threads from a thread pool. For example, the first host may communicate a first and second request for portions of data, in parallel, by respectively utilizing first and second threads from a thread pool. The first request includes a first operation and the second request includes a second operation. The first host receives responses, over the network, corresponding to the one or more requests by using the one or more threads. For example, the first host receives a response from the second host corresponding to the first request by using the first thread. The response includes a first portion of data that was generated, at the second host, by executing the first operation. The first host processes the responses including the first response. For example, the first host may process the first response by generating a first latency and storing the first latency in a sample. The first host may compute the first latency based on the elapsed time for communicating the first request, generating the portion of data at the remote host, and receiving the first response. In addition, the first host counts the first request by incrementing and storing a number of requests in the sample. Responsive to a timeout (e.g., one second), the first host aggregates samples. For example, the first host may aggregate ten one-second samples to generate one ten-second sample. The samples include the first latency and the number of requests. The first host resizes the thread pool based on the aggregating of the samples. Resizing the thread pool causes a throttling of the communicating of requests. For example, a first host with a thread pool of eight may send eight requests for portions of data in parallel, but a first host with a thread pool of four may only send four requests for portions of data in parallel.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2019-2020, All Rights Reserved.

It will be appreciated that some of the examples disclosed herein are described in the context of virtual machines that are backed up by using base and incremental snapshots, for example. This should not necessarily be regarded as limiting of the disclosures. The disclosures, systems, and methods described herein apply not only to virtual machines of all types that run a file system (for example), but also to NAS devices, physical machines (for example Linux servers), and databases.

FIG. 1A is a block diagram illustrating a system 100, according to an embodiment, utilizing adaptive throttling. The system 100 includes a networked system 102 including a backup host 104, a source host 106, and a client machine 111. The backup host 104 (e.g., first host), the source host 106 (e.g., second host), and the client machine 111 may communicate over a network 112. The source host 106 (e.g., first host) may be embodied as a production system. The backup host 104 (e.g., second host) may execute a job that backs up a file set from the production system. The source host 106 (e.g., production system) includes a remote server 114 that is communicatively coupled to a storage device 117 that stores a database 118 that, in turn, stores the file set 108. The backup host 104 includes a local server 124 that is communicatively coupled to a storage device 126 that, in turn, includes a database 128 that stores a copy of the file set 108.

The backup host 104 may back up the source host 106 by executing a job that includes two steps. In the first step, the local server 124 fetches metadata for the file set 108 from the remote server 114. In the second step, the backup host 104 backs up the file set 108 based on the metadata. For example, part of the metadata may describe a directory. In one embodiment, the part of the metadata may include a list of file names describing files in the directory with their respective sizes and types. The backup host 104 may fetch the metadata from the source host 106 by utilizing a thread from a thread pool. The backup host 104 utilizes the thread to send a request to the remote server 114, receive a response from the remote server 114, and measure the latency of the round trip. In addition, the backup host 104 stores the latency and increments a count of a number of requests in a sample in a moving average repository (not shown). For example, the backup host 104 may store the latency and increment the count in a one-second sample. The moving average depository may include multiple types of samples with different sample periods. For example, the moving average depository may include ten one-second samples, six ten-second samples, and sixty one-minute samples. The backup host 104 further utilizes a timeout to collect and aggregate the samples for the timeout period and other timeout periods. For example, the backup host 104 responds to the expiration of a one-second timeout by moving the current sample identifier to the next one second-sample and identifying whether the tenth one-second sample has been collected. If the tenth one-second sample has been collected, then the backup host 104 aggregates the ten one-second samples together to form a ten-second sample and stores the ten-second sample. The backup host 104 repeats these steps for the other sample periods.

The local server 124 may throttle the fetching of the metadata by increasing and decreasing the size of the thread pool. Each thread is associated with a process that is utilized by the local server 124 to send a single request to the remote server 114, receive the response from the remote server 114, and process the response. Accordingly, the local server 124 may increase the speed of the fetching by increasing the size of the thread pool. In addition, the local server 124 may decrease the speed of the fetching by decreasing the size of the thread pool. For example, a thread pool of eight threads facilitates the concurrent sending, receiving, and processing of eight, parallel, retrievals of metadata items. The thread pool may be increased and decreased responsive to the identification of predetermined conditions. For example, a predetermined condition may be defined based on an average latency of requests and an average number of requests for a predetermined period of time (e.g., one-minute sample), as described later in this document.

The system 100, may utilize adaptive throttling in a universal backup host, according to an embodiment. For example, in requesting the metadata item, the local server 124 may utilize an operation from one of multiple operation sets. The local server 124 may identify the operation set based on the file sharing protocol that is shared by the source host 106 and the backup host 104. For example, the local server 124 may send a request including an operation from a Unix operation set responsive to identifying the local server 124 and the remote server 114 as utilizing the Network File System protocol. In addition, the local server 124 may send a request including an operation from a Windows operation set responsive to identifying the local server 124 and the remote server 114 as utilizing the Server Message Block protocol, and so forth. Accordingly, the backup host 104 exhibits itself to be "Universal" because it retrieves metadata and backs up file sets 108 from remote servers 114 irrespective of their file sharing protocol.

A user may utilize the client machine 111 to request the backup host 104 to back up the file set 108. For example, the user may utilize the client machine 111 to schedule a periodic back-up of the file set 108 from the source host 106 to the backup host 104. In addition, the user may recover and restore the file set 108 from the backup host 104 to the source host 106 at a point-in-time. For example, the client machine 111 may receive the point-in-time identifying a date-time for restoring and recovering the file set 108 from the backup host 104 to the source host 106. In some embodiments, the file set 108 may be stored in replicate on the source host 106 by utilizing remote server 109 and remote server 110. Similarly, the file set 108 may be backed up in replicate on the backup host 104 by utilizing the local server 124 and local server 132. In some embodiments, the remote server 114 may include multiple servers, the remote server 109 may include multiple servers, the remote server 110 may include multiple servers, the local server 124 may include multiple servers, the local server 130 may include multiple servers, and the local server 132 may include multiple servers.

The database 118 may be a standalone database. For example, the database 118 may not have replicates. In another embodiment, the database 118 may be a cluster database embodied in replicates. For example, the source host 106 may further include a remote server 109 and a remote server 110 that are respectively communicatively coupled to storage devices including replicate databases 118 that store replicate file sets 108. Similarly, the backup host 104 may include a local server 130 and a local server 132 that are respectively communicatively coupled to storage devices including replicate databases 128 that store replicate file sets 108.

The networked system 102 may be embodied as a networked computing environment where the backup host 104, the source host 106, and the client machine 111 are interconnected through one or more public and/or proprietary networks (e.g., Microsoft® provider of Azure Cloud Computing Platform & Services, Amazon provider of Amazon Web Services, and the like). According to another embodiment, the system 100 may be implemented as a single software platform. The backup host 104 may be embodied as a networked computing environment offered by Rubrik Inc., of Palo Alto, California. For example, the backup host 104 may be implemented as a software platform that delivers backup, instant recovery, archival, search, analytics, compliance, and copy data management in one secure fabric across data centers and clouds as offered by Rubrik Inc., of Palo Alto, California.

In some embodiments, the backup host 104 may back up a file set 108 that is stored across multiple storage devices 117 respectively coupled to the multiple remote servers 114 (e.g., PRIMARY). Similarly, in some embodiments, the backup host 104 may back up a file set 108 across multiple storage devices 126 respectively coupled to multiple local servers 124 (e.g., PRIMARY). In one embodiment, the multiple remote servers 114 (e.g., PRIMARY) and the multiple local servers 124 (e.g., PRIMARY) may be embodied as network-attached storage (e.g., NAS). In another embodiment, the multiple remote servers 114 (e.g., PRIMARY) and the multiple local servers 124 (e.g., PRIMARY) may be embodied as stand-alone hosts. In another embodiment, the multiple remote servers 114 (e.g., PRIMARY) and the multiple local servers 124 (e.g., PRIMARY) may be embodied in different combinations of network-attached storage (e.g., NAS) and stand-alone hosts.

Figure 1B:
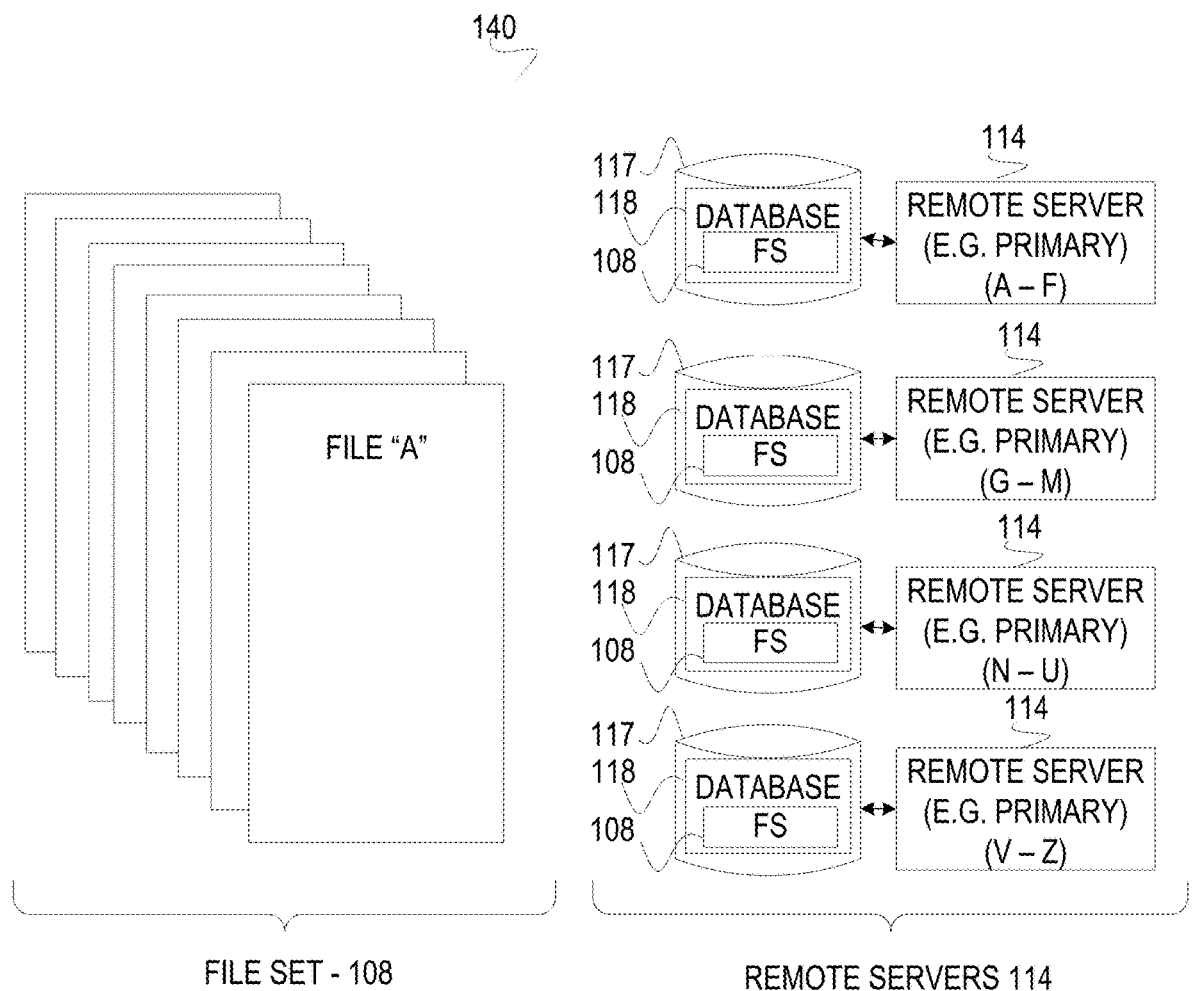
FIG. 1B is a block diagram illustrating a system, according to an embodiment, to utilize adaptive throttling.

FIG. 1B is a block diagram illustrating a system 140, according to an embodiment, to utilize adaptive throttling. The system 140 may be utilized to process a file set 108 that is distributed over multiple remote servers 114. The system 140 corresponds to the system 100 in FIG. 1A; accordingly, the same or similar references have been used to indicate the same or similar features unless otherwise indicated. The system 140 includes a file set 108 split into four shards and distributed across four remote servers 114 (e.g., PRIMARY). For example, the file set 108 may be a catalog organized alphabetically with a file corresponding to each letter of the alphabet where a first remote server 114 stores files "A" through "F;" a second remote server 114 stores files "G" through "M;" the third remote server 114 stores files "N" through "U;" and the fourth remote server 114 stores files "V" through Z."

Figure 1C:
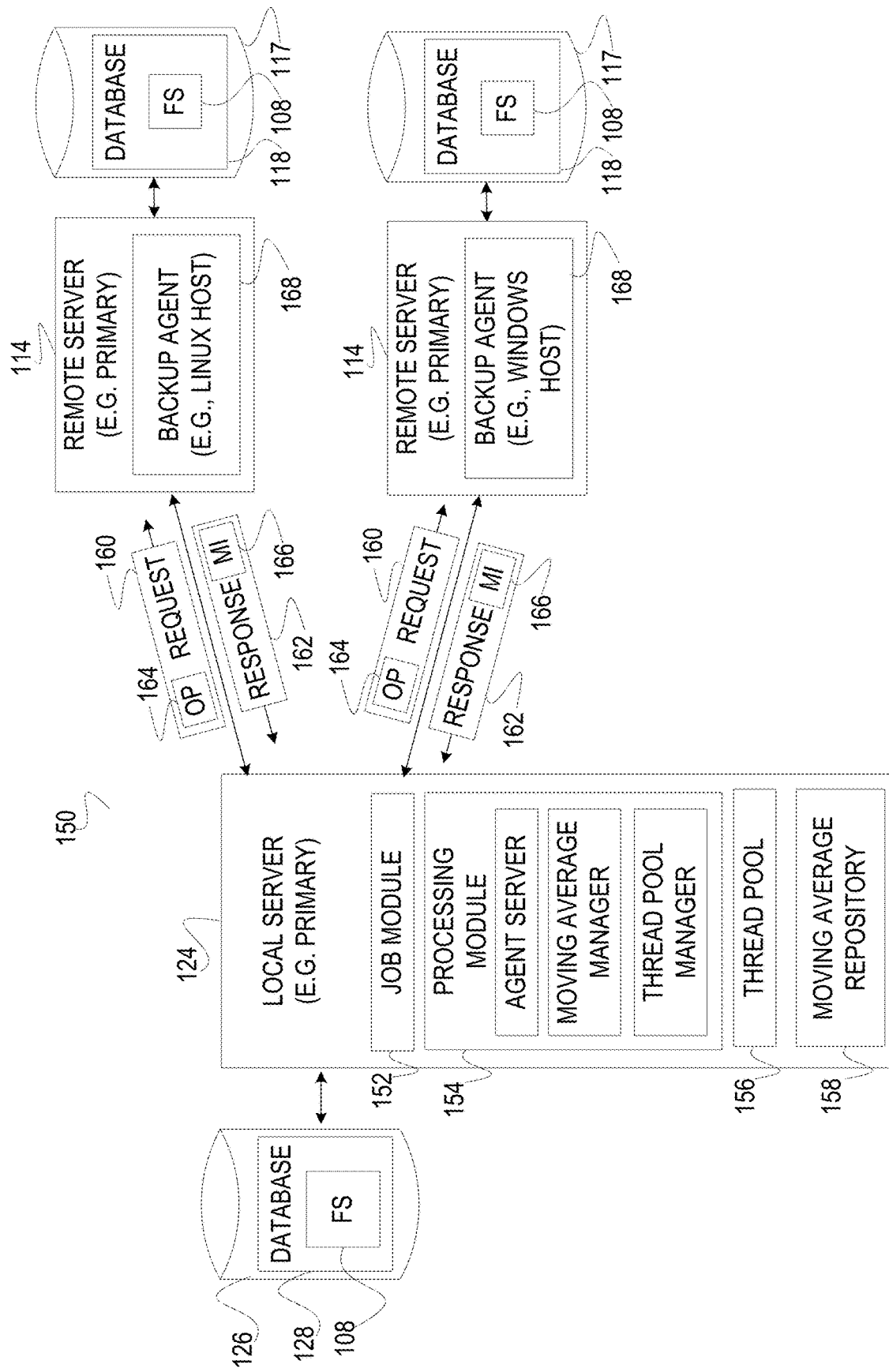
FIG. 1C is a block diagram illustrating a system, according to an embodiment, to utilize adaptive throttling.

FIG. 1C is a block diagram illustrating a system 150, according to an embodiment, to utilize adaptive throttling. The system 150 may be utilized to communicate with remote servers 114 utilizing different file sharing protocols. The system 150 corresponds to the system 100 in FIG. 1A; accordingly, the same or similar references have been used to indicate the same or similar features unless otherwise indicated. The local server 124 includes a job module 152 (e.g., job), a processing module 154, a thread pool 156, and a moving average repository 158. The job module 152 may be utilized to back up the file set 108 from the one or more remote servers 114. The job may be triggered periodically by a scheduler or incidentally by a user who enters a command or makes a selection from a client machine, as previously described. The processing module 154 may include an agent server, a moving average manager, and a thread pool manager.

The agent server utilizes the thread pool 156 to concurrently send requests 160, in parallel, to the remote servers 114, receive responses 162 to the requests 160, and process the responses 162. For example, the agent server may utilize a thread pool 156 including ten threads to concurrently send ten requests 160, in parallel, to the remote servers 114. Accordingly, the size of the thread pool 156 determines the maximum limit for the concurrent sending of requests 160, in parallel, to the remote servers 114. The agent server utilizes one thread to send a request 160, receive a response 162 to the request 160, and process the response. The agent server stores an operation 164 in the request 160 that, in turn, is executed on the remote server 114 to generate a metadata item 166 (e.g., portion of data) that, in turn, is included in a response 162. The agent server may select the operation from one of multiple operation sets. The agent server may identify the operation set based on the file sharing protocol being utilized by the remote server 114. For example, the agent server may send a request including an operation 164 from a Unix operation set responsive to identifying the remote server 114 as utilizing the Network File System file sharing protocol. In addition, the agent server may send a request including an operation 164 from a Windows operation set responsive to identifying the remote server 114 as utilizing the Server Message Block protocol, and so forth. Accordingly, the backup host 104 exhibits itself as "Universal" because it includes a local server 124 that may retrieve a metadata item 166 from remote servers 114 irrespective of the file sharing protocol that is being utilized by the remote servers 114. The agent server receives the response 162, stores the metadata item 166 in the moving average repository 158, and increments a number of requests in the moving average repository 158. For example, the agent server may receive the response 162, stores the metadata item 166 in a sample in a moving average (e.g., ten second samples) in the moving average repository 158, increments a number of requests in the sample.

The remote server 114 includes a backup agent 168 that receives the request 160, executes the operation 164 to generate the metadata item 166, stores the metadata item 166 in the response 162, and communicates the response 162 to the local server 124. For example, the backup agent 168 may utilize the Unix operation set and the Network File System file sharing protocol. In another example, the backup agent 168 utilizes a Windows operation set and a Server Message Block file sharing protocol, and so forth.

The moving average manager aggregates the samples in the moving averages responsive to a timeout. For example, the moving average manager responds to the expiration of a one-second timeout by moving a current sample identifier to the next sample and identifying whether the tenth one-second sample has been collected. If the tenth one-second sample has been collected, then the moving average manager aggregates the ten one-second samples together to form one ten-second sample and stores the ten-second sample in the appropriate moving average (e.g., ten-second samples). In addition, if six ten-second samples have been collected, then the moving average manager aggregates the six ten-second samples together to form one one-minute sample and stores the one-minute sample in a moving average (e.g., one minute samples), and so forth.

The thread pool manager resizes the thread pool based on the aggregating. For example, the thread pool manager may resize the thread pool responsive to aggregating a ten-second sample and/or aggregating a one-minute sample. The thread pool manager may resize the thread pool by increasing the number threads in the thread pool or by decreasing the number of threads in the thread pool, as described later in this document.

Figure 1D:
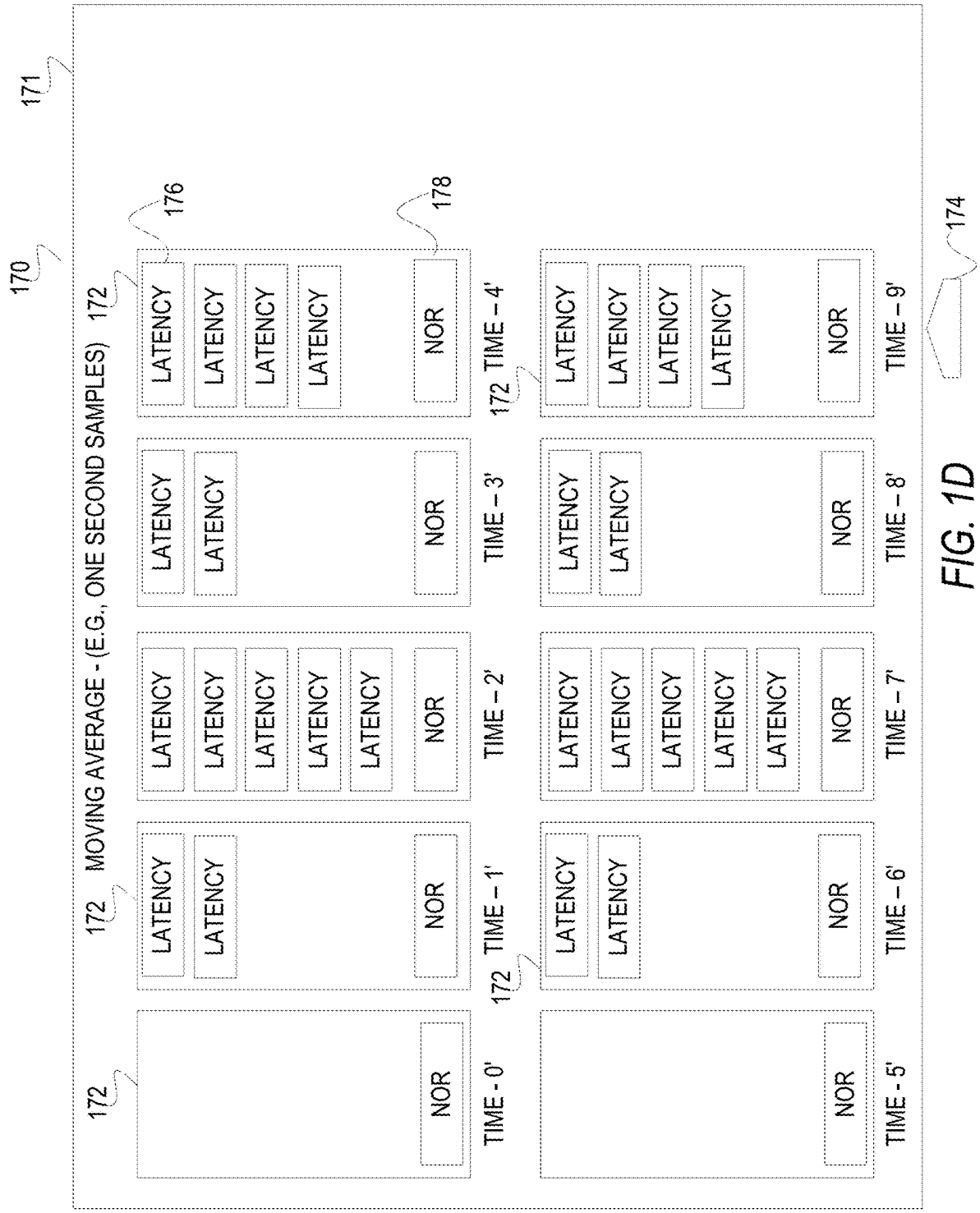
FIG. 1D is a block diagram illustrating a moving average, according to an embodiment.

FIG. 1D is a block diagram illustrating a moving average 170, according to an embodiment. The moving average 170 stores initial samples 172 (e.g., one-second samples). Each of the samples are for a one-second duration. The moving average 170 includes ten initial samples 172 (e.g., samples). The samples are respectively identified "TIME-0'," "TIME-1'," "TIME-2'," "TIME-3'," "TIME-4'," "TIME-5'," "TIME-6'," "TIME-7'," "TIME-8'," and "TIME-9'." The current sample identifier 174 identifies a sample that is currently being used to storing latencies and count the number of requests. For example, responsive to receiving a response 162 from a remote server 114, the agent server stores a latency 176 and increments the number of requests 178 in the sample identified by the current sample identifier 174 (e.g., "TIME-9"). The moving average 171 is a circular buffer.

Figure 1E:
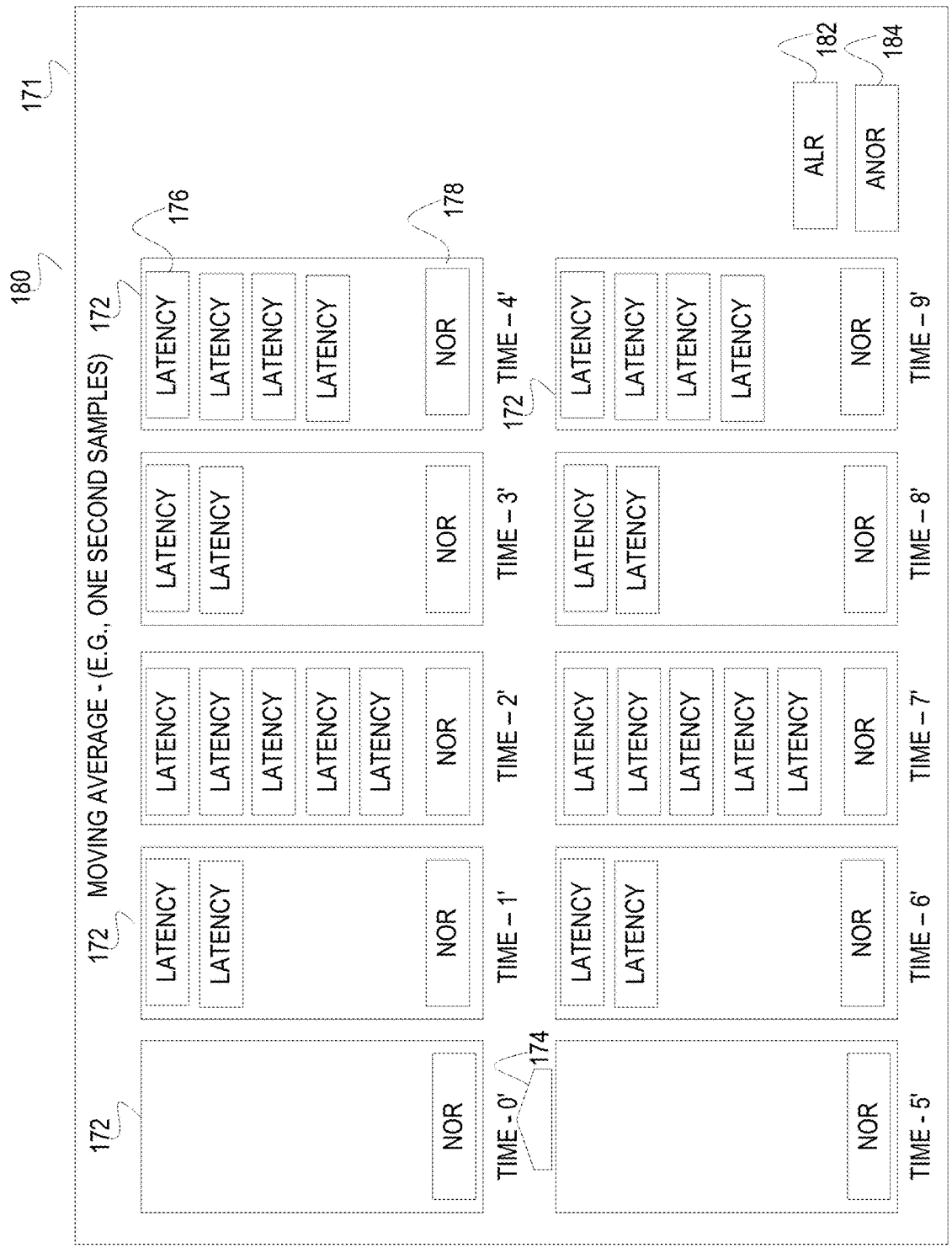
FIG. 1E is a block diagram illustrating a moving average, according to an embodiment.

FIG. 1E is a block diagram illustrating a moving average 180, according to an embodiment, for storing one-second samples. The moving average 180 corresponds to the moving average 170 in FIG. 1D accordingly, the same or similar references have been used to indicate the same or similar features unless otherwise indicated. Responsive to receiving a timeout (e.g., for a one-second period), the moving average manager advances the current sample identifier 174 by one and identifies whether the moving average 180 is full. For example, if the moving average manager identifies the moving average 180 is full (e.g., current sample identifier 174 equal to "TIME-0"), then the moving average manager aggregates (adds) the latencies 176 in the moving average 180 to generate a sum and divides the sum by the number of samples (e.g., ten) to generate an average latency request 182 (e.g., average latency of requests) for the moving average 180. In addition, the moving average manager aggregates (adds) the number of requests 178 in the moving average 180 to generate a sum and divides the sum by the number of samples (e.g., ten) to generate an average number of requests 184 for the moving average 180. Finally, the moving average manager stores the average latency requests 182 and the average number of requests 184 in a moving average that stores the appropriate size samples (e.g., ten-second samples) and sends an event to the thread pool manager signaling the generation of the sample (e.g., ten-second sample), as described and illustrated in FIG. 1F.

Figure 1F:
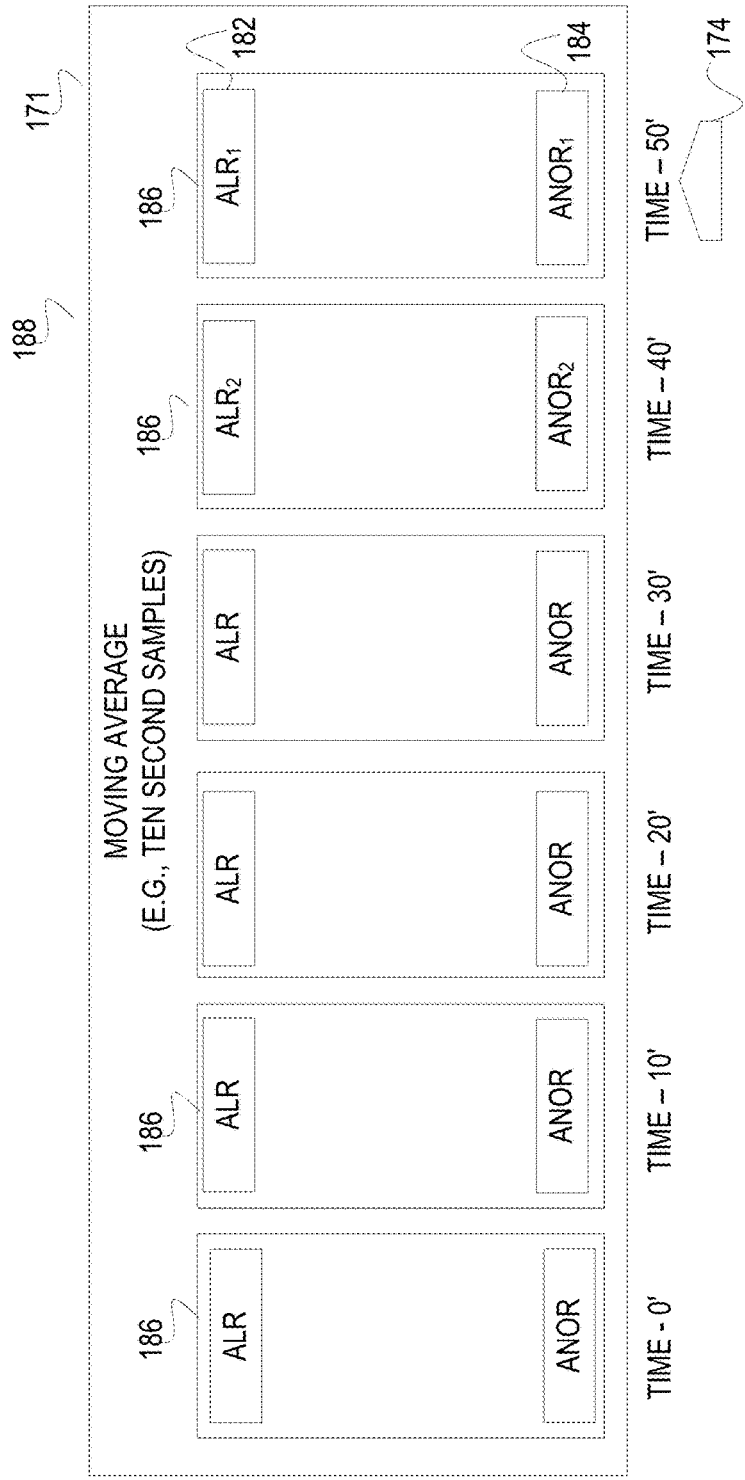
FIG. 1F is a block diagram illustrating a moving average, according to an embodiment.

FIG. 1F is a block diagram illustrating a moving average 188, according to an embodiment. The moving average 188 is a circular buffer that includes six subsequent samples 186 (e.g., samples). Each of the samples are for a ten-second duration. Each of the samples include the average latency request 182 and the average number of requests 184. The samples are respectively identified "TIME-0'," "TIME-10'," "TIME-20'," "TIME-30'," "TIME-40'," and "TIME-50'." The moving average manager advances to the next sample (e.g., "TIME-50") with the current sample identifier 174, stores a sample in the moving average 188 at the location identified by the current sample identifier 174, and identifies whether the moving average 188 is full (e.g., current sample identifier 174 identifies the sample "TIME-0'"). For example, if the moving average manager identifies the moving average 188 is full, then the moving average manager generates a sample (e.g., one-minute). The moving average manager generates the sample (e.g., one-minute) by aggregating (adding) the average latency of requests 182 in the moving average 188 in the subsequent samples 186 (e.g., six ten-second samples) to generate a sum and divides the sum by the number of samples (e.g., six) to generate an average latency request 182. In addition, the moving average manager aggregates the average number of requests 184 in the subsequent samples 186 to generate a sum and divides the sum by the number of samples (e.g., six) to generate an average number of requests 184. Finally, the moving average manager stores the sample (e.g., one-minute) that was aggregated in the appropriate moving average (e.g., one-minute samples) and sends an event to the thread pool manager (e.g., one minute sample).

Figure 1G:
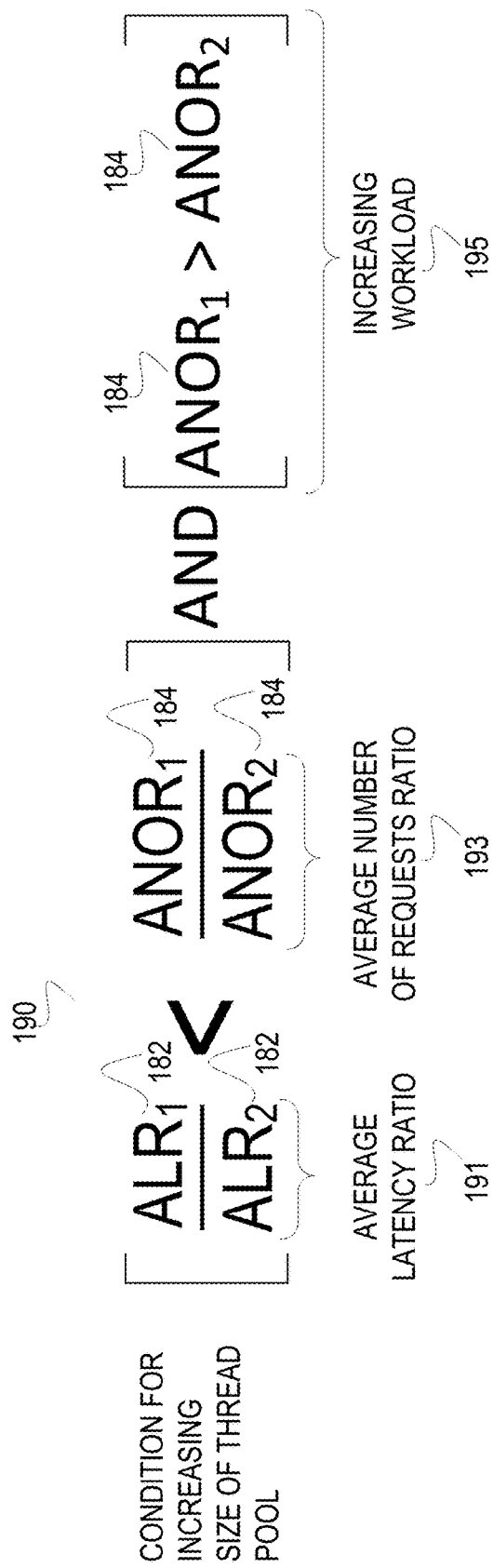
FIG. 1G is a block diagram illustrating a condition, according to an embodiment, to increase a size of a thread pool.

FIG. 1G is a block diagram illustrating a condition 190, according to an embodiment, to increase a size of the thread pool 156. If the condition 190 is identified "TRUE" then the number of threads in the thread pool 156 is increased. For example, if the condition 190 is identified "TRUE" then maximum threads 212 may be increased. The condition 190 includes the average latency request 182 (ALR) and the average number of requests 184 (ANOR) for the two most recent samples in a moving average. The subscript "1" identifies the most recent sample and the subscript "2" identifies the sample that was collected before the most recent sample. For example, FIG. 1F illustrates the moving average 188 as including the two most recent samples of the average latency of requests 182 with the subscripts "1" and "2" and as including the two most recent samples of the average number of requests 184 with the subscripts "1" and "2." Returning to FIG. 1G, the condition 190 includes three expressions including an average latency ratio 191, an average number of requests ratio 193, and an increasing workload 195. If the thread pool manager identifies the condition as being TRUE, then thread pool manager increases the size of the thread pool 156. In one embodiment, the number of threads may be increased by adding to maximum threads 212. For example, the thread pool manager may add one to maximum threads 212 responsive to identifying the condition as being TRUE. In some embodiments, the number of threads added to maximum threads 212 is configurable. In one embodiment, the number of threads added to the maximum threads 212 may be increased by multiplying the number of threads in the thread pool 156 (e.g., current threads 214) by a percentage (e.g., 25%) to identify a number of threads to add to maximum threads 212. In some embodiments, the percentage may be configurable.

Figure 1H:
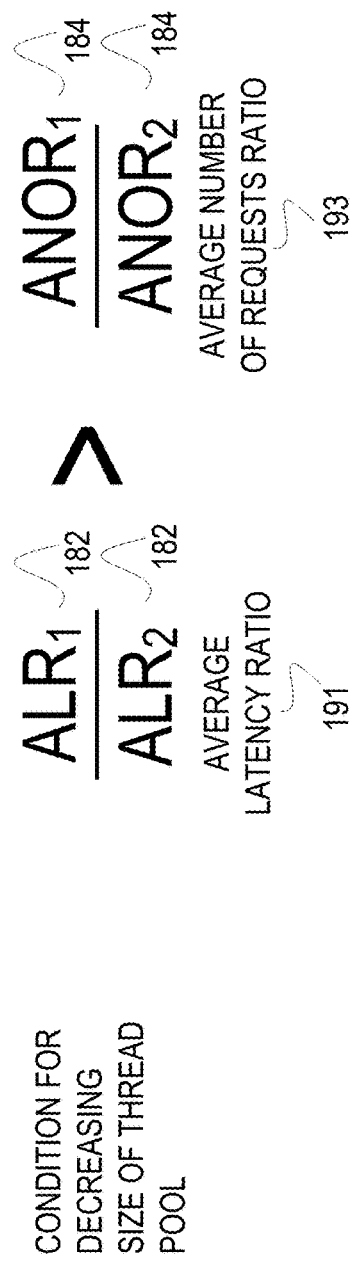
FIG. 1H is a block diagram illustrating a condition, according to an embodiment, to decrease the size of the thread pool.

FIG. 1H is a block diagram illustrating a condition 192, according to an embodiment, to decrease a size of a thread pool. If the condition 192 is identified "TRUE" then the number of threads in the thread pool 156 is decreased. For example, if the condition 192 is identified "TRUE" then the maximum threads 212 may be decreased. The condition 192 includes the average latency request 182 (ALR) and the average number of requests 184 (ANOR) for the two most recent samples in a moving average. The subscript "1" identifies the most recent sample and the subscript "2" identifies the sample collected before the most recent sample, as previously described. The condition 190 includes two expressions including the average latency ratio 191 and the average number of requests ratio 193. If the thread pool manager identifies the condition 192 as being TRUE, then thread pool manager decreases the size of the thread pool 156. According to an embodiment, the number of threads in the thread pool may be decreased by subtracting. For example, the thread pool manager may subtract one thread from the maximum threads 212 responsive to identifying the condition 192 as being TRUE. In some embodiments, the number of threads subtracted from maximum threads 212 is configurable. In one embodiment, the number of threads subtracted from maximum threads 212 may be decreased by multiplying the number of threads in the thread pool 156 (e.g., current threads 214) by a percentage (e.g., 25%) to identify the number of threads to subtract from the maximum threads 212. In some embodiments, the percentage may be configurable.

Figure 2A:
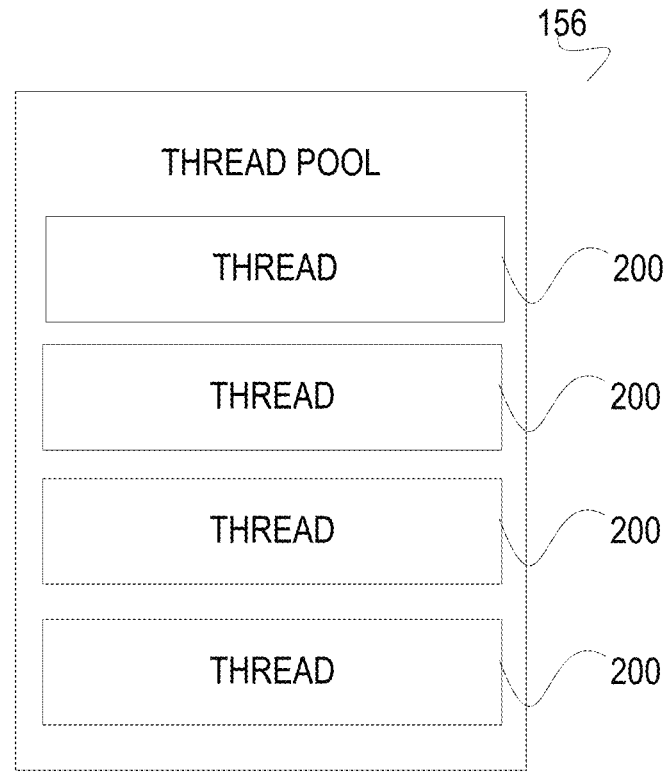
FIG. 2A is a block diagram illustrating a thread pool, according to an embodiment.

FIG. 2A is a block diagram illustrating a thread pool 156, according to an embodiment. The thread pool 156 includes one or more threads 200. Each thread 200 may be utilized to send a request 160, receive a corresponding response 162, and process the response 162. The size of the thread pool 156 may be increased or decreased to throttle the retrieving of the metadata item 166 from the source host 106, as previously described.

Figure 2B:
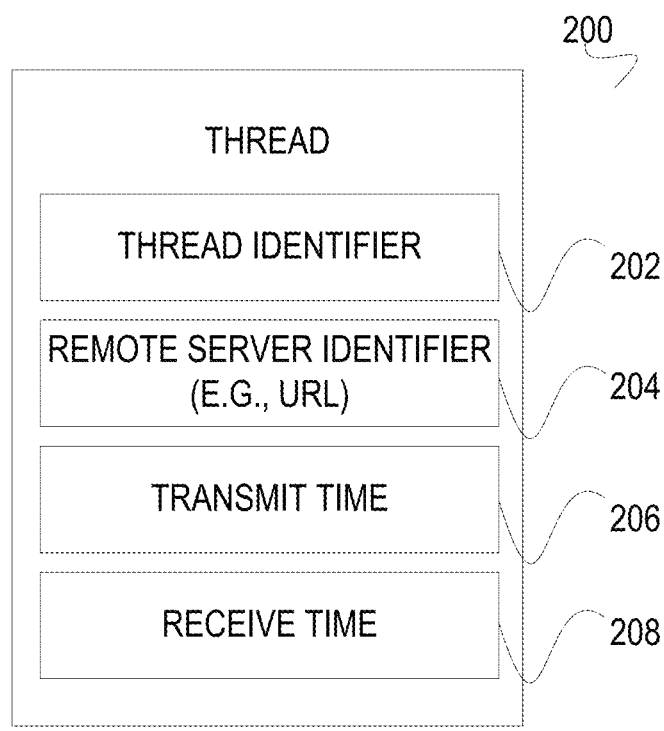
FIG. 2B is a block diagram illustrating a thread, according to an embodiment.

FIG. 2B is a block diagram illustrating a thread 200, according to an embodiment. The thread 200 includes a thread identifier 202, a remote server identifier 204, a transmit time 206, and a receive time 208. The thread identifier 202 uniquely identifies the thread 200. The remote server identifier 204 identifies the remote server 114 associated with a request 160. For example, the remote server identifier 204 may store a universal resource locator (e.g., URL) identifying a location on the network 112 of the remote server 114 that was sent the request 160. The transmit time 206 registers a time the request 160 was sent to the remote server 114. For example, the agent server may register a time stamp for the current time in the transmit time 206 responsive to sending a request 160 to the remote server 114. The receive time 208 registers the time a response to the request is received from the remote server 114. For example, the agent server may register a time stamp for the current time in the receive time 208 responsive to receiving the response from the remote server 114.

Figure 2C:
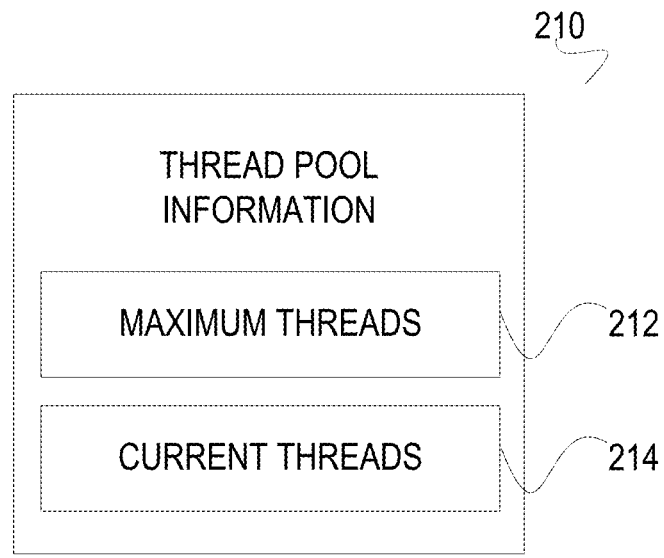
FIG. 2C is a block diagram illustrating thread pool information, according to an embodiment.

FIG. 2C is a block diagram illustrating a thread pool information 210, according to an embodiment. The thread pool information 210 includes maximum threads 212 and current threads 214. The maximum threads 212 is the maximum number of threads 200 that the job module 152 utilizes to concurrently retrieve the metadata items 166, in parallel, from the source host 106. The maximum threads 212 may be incremented by the thread pool manager based on the condition 190 for increasing the size of the thread pool 156 and decremented by the thread pool manager based on the condition 192 for decreasing the size of the thread pool 156, as previously described. The current threads 214 is the current number of threads being utilized by the job module 152 to concurrently retrieve the metadata item 166, in parallel, from the source host 106. For example, a current thread 214 value of four indicates the job module 152 has spawned four threads 200 (e.g., processes) of the agent server to communicate the requests 160, receive the responses 162 and process the responses 162. The current threads may be incremented by the agent server responsive to the agent server identifying the current threads 214 as being less than the maximum threads 212. The current threads 214 may be decremented by the agent server and responsive to the agent server identifying the current threads 214 as being greater than the maximum threads 212.

FIG. 2D is a block diagram illustrating a moving average repository 158, according to an embodiment. The moving average repository 158 stores one or more moving averages 171 that, in turn, store samples. For example, each of the moving averages 171 may respectively store samples that are collected for a different period of time (e.g., one-second, ten-seconds, one-minute, ten-minutes, and so forth). The moving average 171 associated with the shortest period of time stores initial samples 172 and the remaining moving averages 171 store subsequent samples 186.

Figure 2E:
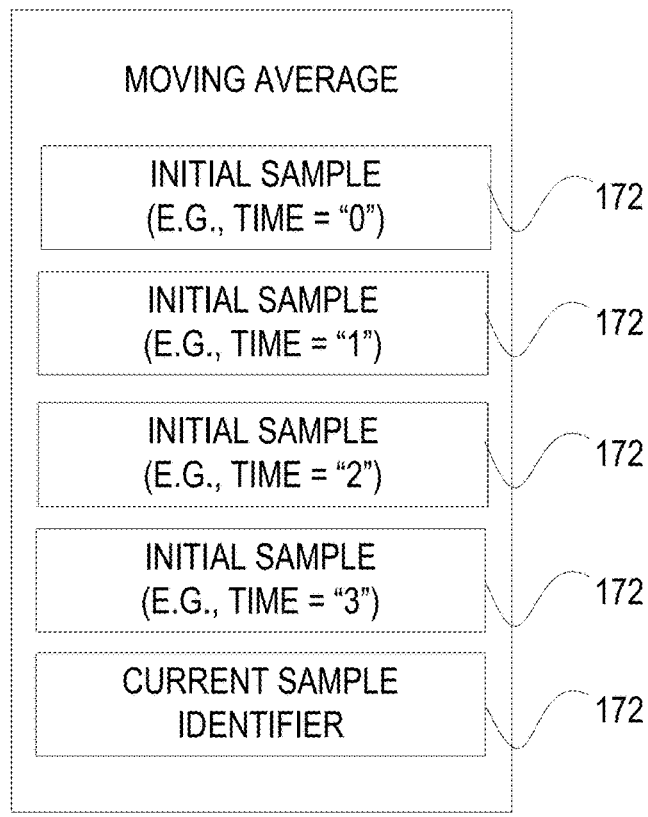
FIG. 2E is a block diagram illustrating a moving average, according to an embodiment.

FIG. 2E is a block diagram illustrating moving average 171, according to an embodiment. The moving average 171 includes one or more initial samples 172 (e.g., samples) and a current sample identifier 174. The present example includes four initial samples 172 (e.g., TIME="0," TIME="1," TIME="2," TIME="3"). The moving average 171 is a circular buffer. Accordingly, the sample after "TIME=3" is the sample for "TIME=0."

Figure 2F:
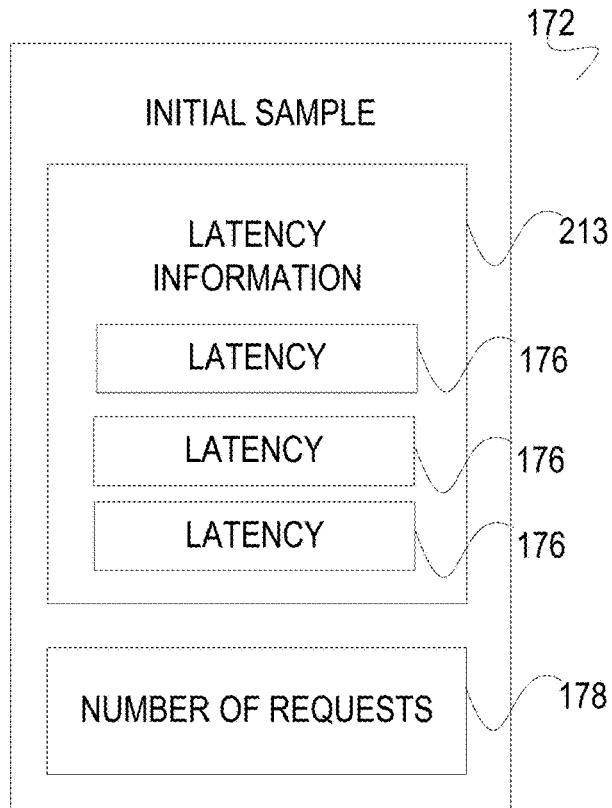
FIG. 2F is a block diagram illustrating an initial sample, according to an embodiment.

FIG. 2F is a block diagram illustrating the initial sample 172, according to an embodiment. The initial sample 172 includes latency information 213 and number of requests 178. The latency information 213 includes one or more latencies 176. Each latency 176 is a measure of time that elapses from the sending of a request 160 to the receiving of a corresponding response 162. The number of requests 178 is a count of the number of requests 160 sent to the remote server 114 for the initial sample 172 period (e.g., one second). The number of requests 178 and the number of latencies 176 should match.

Figure 2G:
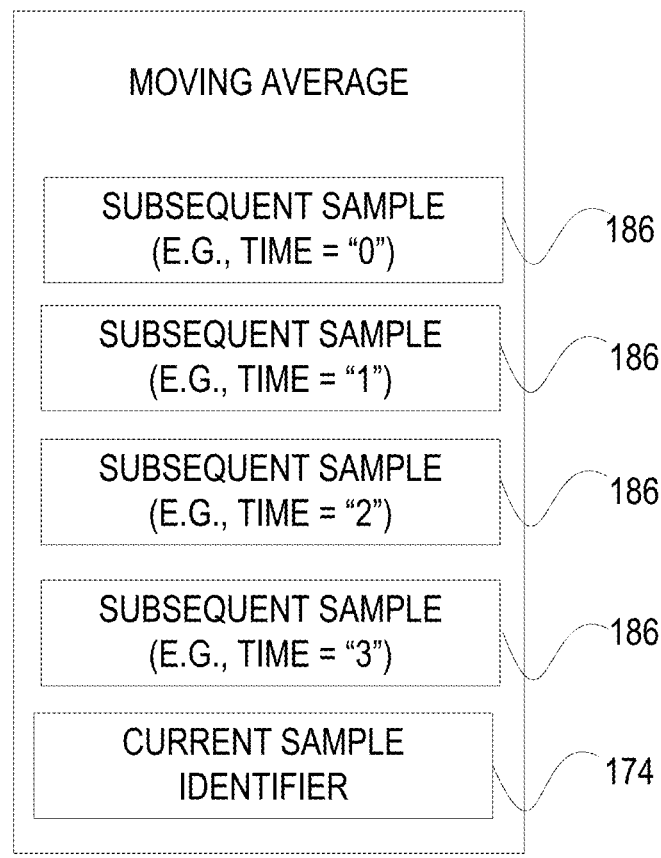
FIG. 2G is a block diagram illustrating a moving average, according to an embodiment.

FIG. 2G is a block diagram illustrating moving average 171, according to an embodiment. The moving average 171 includes one or more subsequent samples 186 (e.g., samples) and a current sample identifier 174. For example, the moving average 171 in FIG. 2G includes four subsequent samples 186 (e.g., TIME="0," TIME="1," TIME="2," TIME="3"). The moving average manager may store and aggregate the subsequent samples 186. For example, the moving average manger may store a subsequent sample 186 (e.g., sample) in the moving average 171 in accordance with the current sample identifier 174 and identify whether the moving average 171 is full. If the moving average manager identifies the moving average 171 is full (e.g., TIME="3"), then the moving average manager generates a new subsequent sample 186 by aggregating the subsequent samples 186 in the moving average 171 and advancing the current sample identifier 174 to the next initial sample (e.g., TIME="0").

Figure 2H:
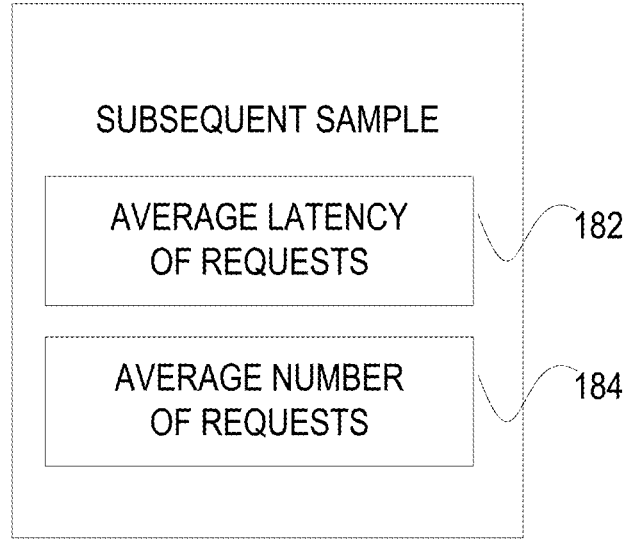
FIG. 2H is a block diagram illustrating a subsequent sample, according to an embodiment.

FIG. 2H is a block diagram illustrating a subsequent sample 186, according to an embodiment. The subsequent sample 186 includes the average latency of requests 182 and the average number of requests 184.

Figure 3A:
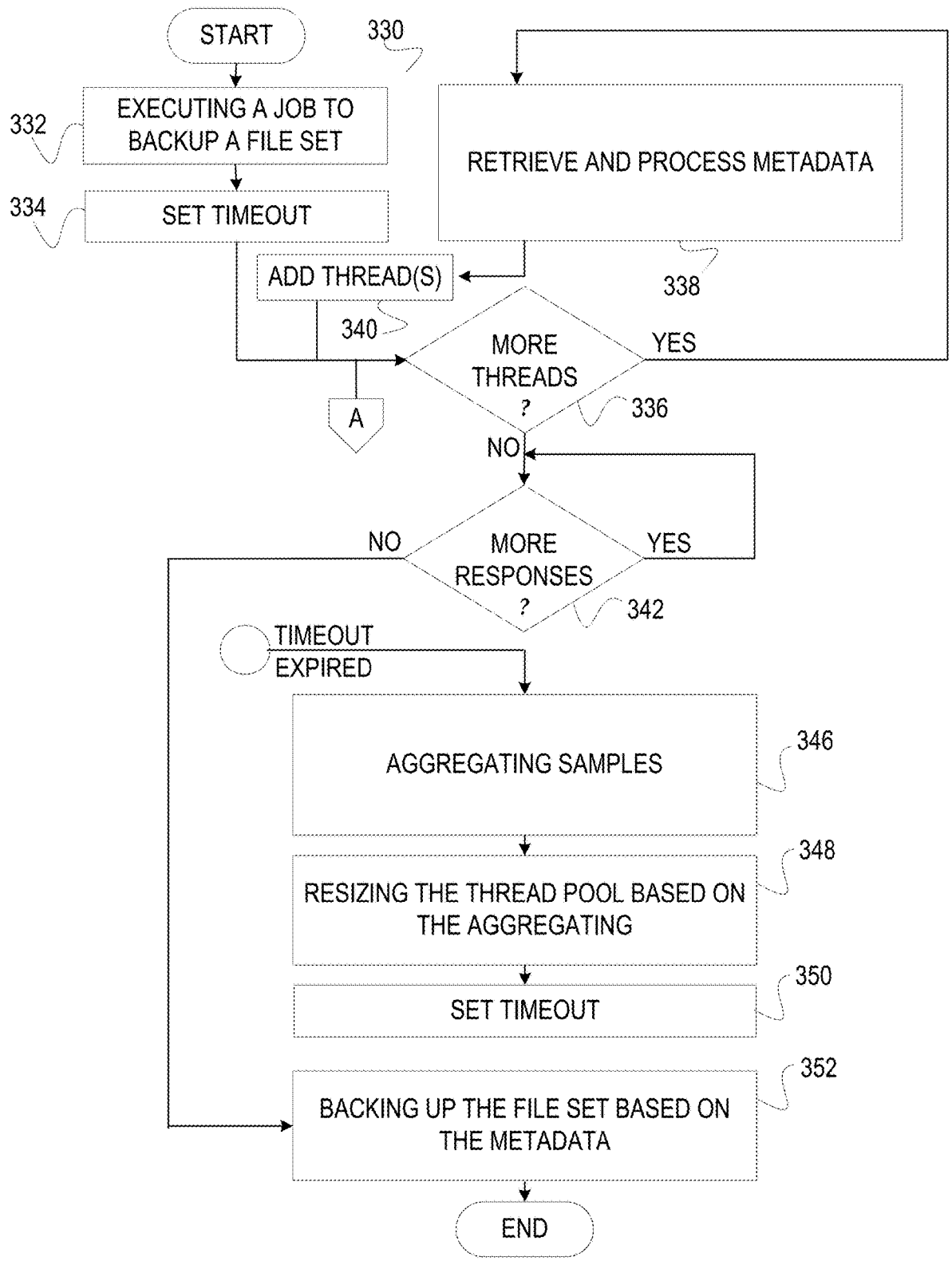
FIG. 3A is a block diagram illustrating a method, according to an embodiment, for adaptive throttling.

FIG. 3A is a block diagram illustrating a method 330, according to an embodiment, for adaptive throttling. The method 330 for adaptive throttling may be for a backup host 104 that is universal, according to an embodiment. The method 330 for adaptive throttling may be for a source host 106, according to an embodiment. The method 330 for adaptive throttling may include the adaptive throttling communication protocol, according to an embodiment.

The method 330 commences, at the backup host 104, at the operation 332, with the job module 152 (e.g., job) responding to receipt of a triggering event. For example, the job may respond to receiving the triggering event by executing to back up a file set 108 from the source host 106 to the backup host 104. For example, the triggering event may be sent periodically (e.g., noon each day, on the hour, each hour, and so forth) from a scheduler to back up the file set 108 "XYZ." Also, for example, a triggering event may be caused by a user who enters a command from the client machine 111 (e.g., backup "XYZ") or selects a user interface element. Other embodiments include other triggering events. In some embodiments, multiple job modules 152 may execute at the same time with execution being utilized to back up a single file set 108.

At operation 334, the job module 152 sets a timeout to schedule an execution of the moving average manager. For example, the job module 152 may set a one-second timeout that causes a scheduler to wait one second before sending a triggering event to the moving average manager causing the moving average manager to execute.

At decision operation 336, the job module 152 identifies whether to spawn a thread of the agent server. If current threads 214 is less than maximum threads 212, the job module 152 spawns a thread of the agent server and branches to operation 338. Otherwise, the job module 152 branches to decision operation 342. At operation 338, the agent server retrieves and processes the metadata item 166 as further described and illustrated in FIG. 3B. Returning to FIG. 3A, at operation 340, the job module 152 may add a value of one or more to the current threads 214, according to an embodiment.

At decision operation 342, the job module 152 identifies whether the agent server is waiting for one or more responses 162. If the job module 152 identifies the agent server is waiting for one or more responses 162, processing continues at decision operation 342. Otherwise, processing continues at operation 352.

At operation 346, an expiration of a timeout (e.g., one second) causes the moving average manager to execute. The moving average manager may aggregate samples in one or more moving averages 171 in the moving average repository 158 responsive to the timeout. For example, the moving average manager may aggregate samples in a one-second moving average 171 to generate a ten-second sample, and/or aggregate samples in a ten-second moving average 171 to generate a one minute sample, and/or aggregate samples in a one-minute moving average 171 to generate a one hour sample, and so forth. The operation 346 is further illustrated in FIG. 5 and described in the written description.

At operation 348, the thread pool manager may resize the thread pool 156. For example, the thread pool manager may resize the thread pool 156 responsive to receive a triggering event from the moving average manager indicating the moving average manager generated a new sample (e.g., one-second sample, ten-second sample, and so forth). At operation 350, the moving average manager resets the timeout (e.g., one second). At operation 352, the job module 152 backs up the file set 108 from the source host 106 to the backup host 104 based on the metadata.

Figure 3B:
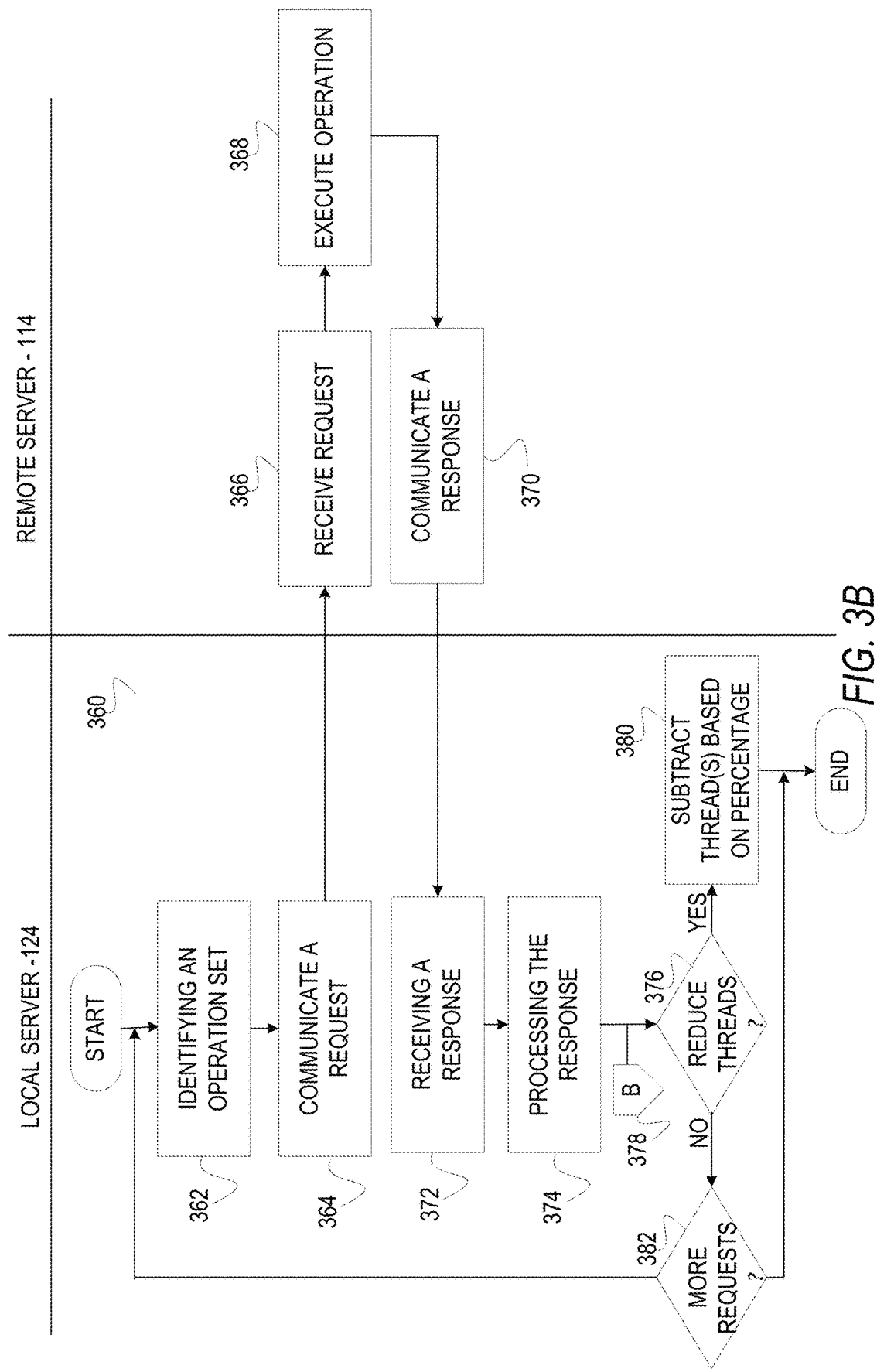
FIG. 3B is a block diagram illustrating a method, according to an embodiment, for communicating requests and responses.

FIG. 3B is a block diagram illustrating a method 360, according to an embodiment, for communicating requests 160 in parallel, receiving responses 162, and processing the responses 162. Illustrated on the left are operations performed by the local server 124 and illustrated on the right are operations performed by the remote server 114. The method 360 commences at operation 362, on the local server 124, with the agent server, executing as one thread 200, identifying an operation set (e.g., first operation set) from multiple operation sets. The agent server may identify the operation set based on a file sharing protocol. For example, the agent server may identify the operation set (e.g., Windows) responsive to the agent server identifying file sharing protocol (e.g., Server Message Block) is being utilized by the remote server 114. At operation 364, the agent server communicates a request 160, over the network 112, to the remote server 114. For example, the agent server may store an operation 164 (e.g., "dir" Windows Command) in the request 160, store a URL for the remote server 114 in the remote server identifier 204 in the thread 200, retrieve the current time (e.g., timestamp) from the operating system, store the timestamp in the transmit time 206 of the thread 200, and communicate the request 160 to the remote server 114.

At operation 366, at the remote server 114, the backup agent 168 receives the request 160. At operation 368, the backup agent 168 executes the operation 164 in the request 160. For example, the backup agent 168 may extract the operation 164 from the request 160 and execute the operation 164 to generate the metadata item 166. At operation 370, the backup agent 168 stores the metadata item 166 in the response 162 and communicates the response 162 to the local server 124.

At operation 372, at the local server 124, the agent server receives a response 162. For example, the agent server may receive the response 162, retrieve the current time (e.g., timestamp) from the operation system, and store the timestamp in the receive time 208 in the corresponding thread 200. At operation 374, the agent server processes the response 162. For example, the agent server may process the response 162 by computing (e.g., generating) and storing the latency 176 in the initial sample 172 and incrementing the number of requests 178 in the initial sample 172. The operation 374 is further illustrated in described FIG. 3C. At decision operation 376, the agent server identifies whether to reduce the number of threads 200. For example, if the agent server identifies the maximum threads 212 is less than the current threads 214, then the agent server branches to operation 380. Otherwise, the agent server branches to operation 382. At the off-page connector "B" 378, the agent server receives control from the thread pool manager. For example, the agent server may receive a triggering event from the thread pool manager to reduce the number of threads 200. At operation 380, the agent server subtracts one or more threads from the current threads 214 based on a percentage. According to an embodiment, the agent server may multiply the current threads 214 by twenty percent to identify a value that is subtracted from the current threads 214. For example, if the current threads 214 equals ten, then the agent server may multiply the current threads 214 (e.g., ten) by twenty percent to identify the value, two, that is subtracted from the current threads 214 (e.g., (ten*twenty percent is two) (e.g, (ten-two) is eight). At decision operation 382, the agent server identifies whether there are more requests 160 for communicating to the remote server 114. If the agent server identifies there are more requests 160 for communicating to the remote server 114, then processing branches to operation 362. Otherwise, processing ends.

Figure 3C:
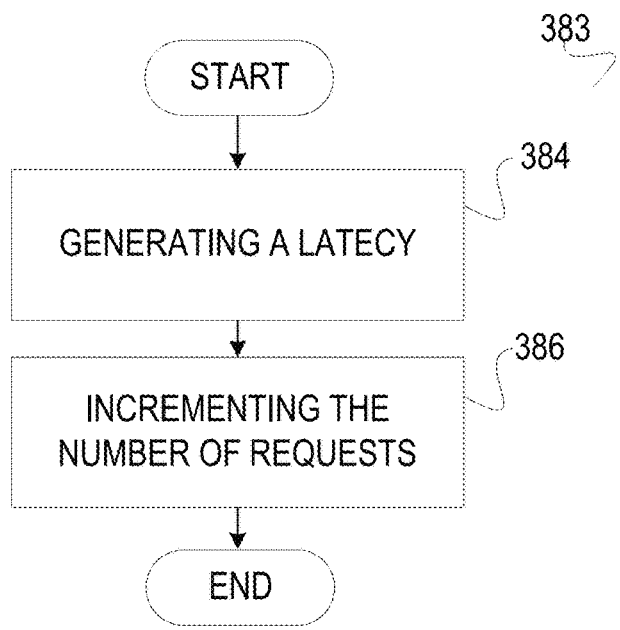
FIG. 3C is a block diagram illustrating a method, according to an embodiment, for processing the responses.

FIG. 3C is a block diagram illustrating a method 383, according to an embodiment, for processing the response 162. The method 383 commences at operation 384, with the agent server generating a latency 176, as further illustrated and described in FIG. 4. At operation 386, the agent server increments the number of requests 178 in the appropriate sample. For example, the agent server may identify an initial sample 172 (e.g., sample) in the moving average 171 (e.g., one-second samples) based on the current sample identifier 174 and increment the number of requests 178 in the initial sample 172 by "1."

Figure 4:
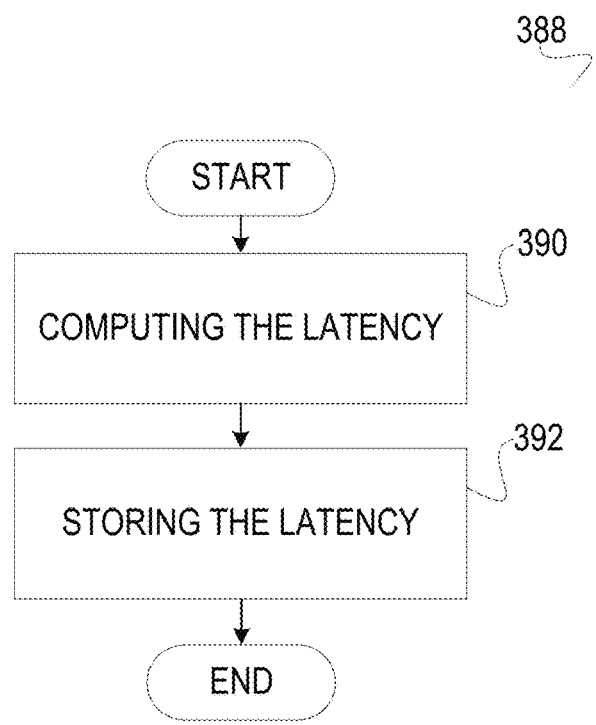
FIG. 4 is a block diagram illustrating a method, according to an embodiment, for generating a latency.

FIG. 4 is a block diagram illustrating a method 388, according to an embodiment, for generating the latency 176. At operation 390, the agent server computes the latency 176. For example, the agent server subtracts transmit time 206, in the thread 200, from the receive time 208, in the thread 200, to compute the latency 176. At operation 392, the agent server stores the latency 176 in the initial sample 172 (sample). For example, the agent server identifies the sample with the current sample identifier 174 in the moving average 171 (e.g., one second samples) and stores the latency 176 in the initial sample 172.

Figure 5:
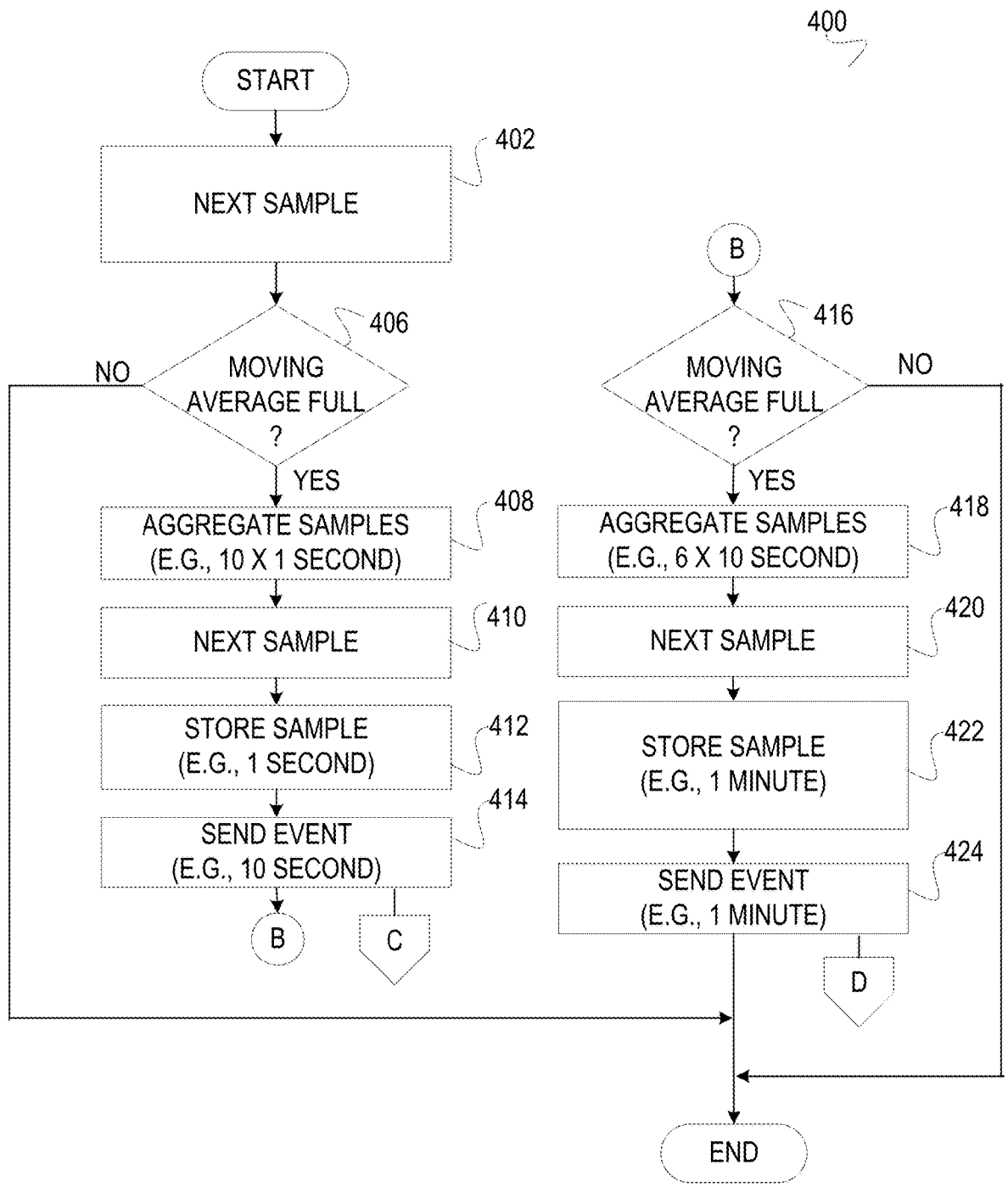
FIG. 5 is a block diagram illustrating a method, according to an embodiment, for aggregating latencies and number of responses.

FIG. 5 is a block diagram illustrating a method 400, according to an embodiment, for aggregating latencies 176 and number of requests 178. At operation 402, the moving average manager advances to the next initial sample 172 (e.g., sample). For example, the moving average manager may increment the current sample identifier 174 by "1." At decision operation 406, the moving average manager identifies whether the moving average 171 is full. For example, the moving average manager may identify whether the current sample identifier 174 points to the initial sample 172 that is first in the moving average. If the moving average manager identifies the initial sample 172 is first (e.g., see FIG. 2E, initial sample 172 associated with TIME="0") in the moving average 171, then processing continues at operation 408. Otherwise processing ends. At operation 408, the moving average manager aggregates the samples. For example, the moving average manager adds each latency 176 in the moving average 171 to generate a sum and divides the sum by the number of samples in the moving average 171 to generate the average latency of requests 182. In addition, the moving average manager adds each of the number of requests 178 in the moving average 171 to generate a sum and divides the sum by the number of samples in the moving average 171 to generate the average number of requests 184. In the present example, the moving average 171 may include ten one-second samples. Accordingly, the moving average manager divides the sum of the number of latencies 176 by ten to generate the average latency of requests 182 and divides the sum of the number of requests 178 by ten to generate the average number of requests 184. At operation 410, the moving average manager advances to the next sample in the next moving average 171. For example, the moving average manager may increment the current sample identifier 174 in the moving average 171 (e.g., ten-second samples) by "1" and tests for a wrap-around condition. If a wrap-around condition is identified, the moving average manager initializes the current sample identifier 174 to zero. At operation 412, the moving average manager stores the sample (e.g., ten-second sample) in the appropriate moving average 171 (e.g., moving average 171 storing ten-second samples). At operation 414, the moving average manager communicates a triggering event to the thread pool manager. For example, the moving average manager may communicate a triggering event indicating a ten-second sample was generated (see FIG. 6, at off-page connector "C").

At decision operation 416, the moving average manager processes the next moving average 171 (e.g., ten-second samples) and begins by identifying whether the moving average 171 (e.g., ten-second samples) is full. For example, the moving average manager may identify whether the current sample identifier 174 points to the subsequent sample 186 (e.g., sample) that is the first in the moving average 171. If the moving average manager identifies the first sample (e.g., see FIG. 2G, subsequent sample 186 associated with TIME="0") in the moving average 171, then processing continues at operation 418. Otherwise processing ends. At operation 418, the moving average manager aggregates the samples. For example, the moving average manager adds each average latency of requests 182 in the moving average 171 to generate a sum of the latency of requests 182 and divides the sum by the number of samples (e.g., six) to generate an average latency of requests 182. In addition, the moving average manager adds each of the average number of requests 184 in the moving average 171 to generate a sum of the average number of requests 184 and divides the sum by the number of samples (e.g., six) to generate an average number of requests 184. In the present example, the moving average 171 may include six ten-second samples. Accordingly, the moving average manager divides the sum of the average latency of requests 182 by six to generate the average latency of requests 182 and divides the sum of the average number of requests 184 by six to generate the average number of requests 184. At operation 420, the moving average manager advances to the next sample in the next moving average 171. For example, the moving average manager may increment the current sample identifier 174 in the moving average 171 (e.g., one minute samples) by "1" and tests for a wrap-around condition. If a wrap-around condition is identified, the moving average manager initializes the current sample identifier 174 to zero. At operation 422, the moving average manager stores the sample (e.g., one minute) in the appropriate moving average 171 (e.g., moving average 171 storing one-minute samples). At operation 424, the moving average manager communicates a triggering event to the thread pool manager. For example, the moving average manager may communicate a triggering event indicating that a one-minute sample was generated (see FIG. 6, at off-page connector "D"). Other embodiments may include additional moving averages 171 (e.g., ten-minute, one hour, and so forth).

Figure 6:
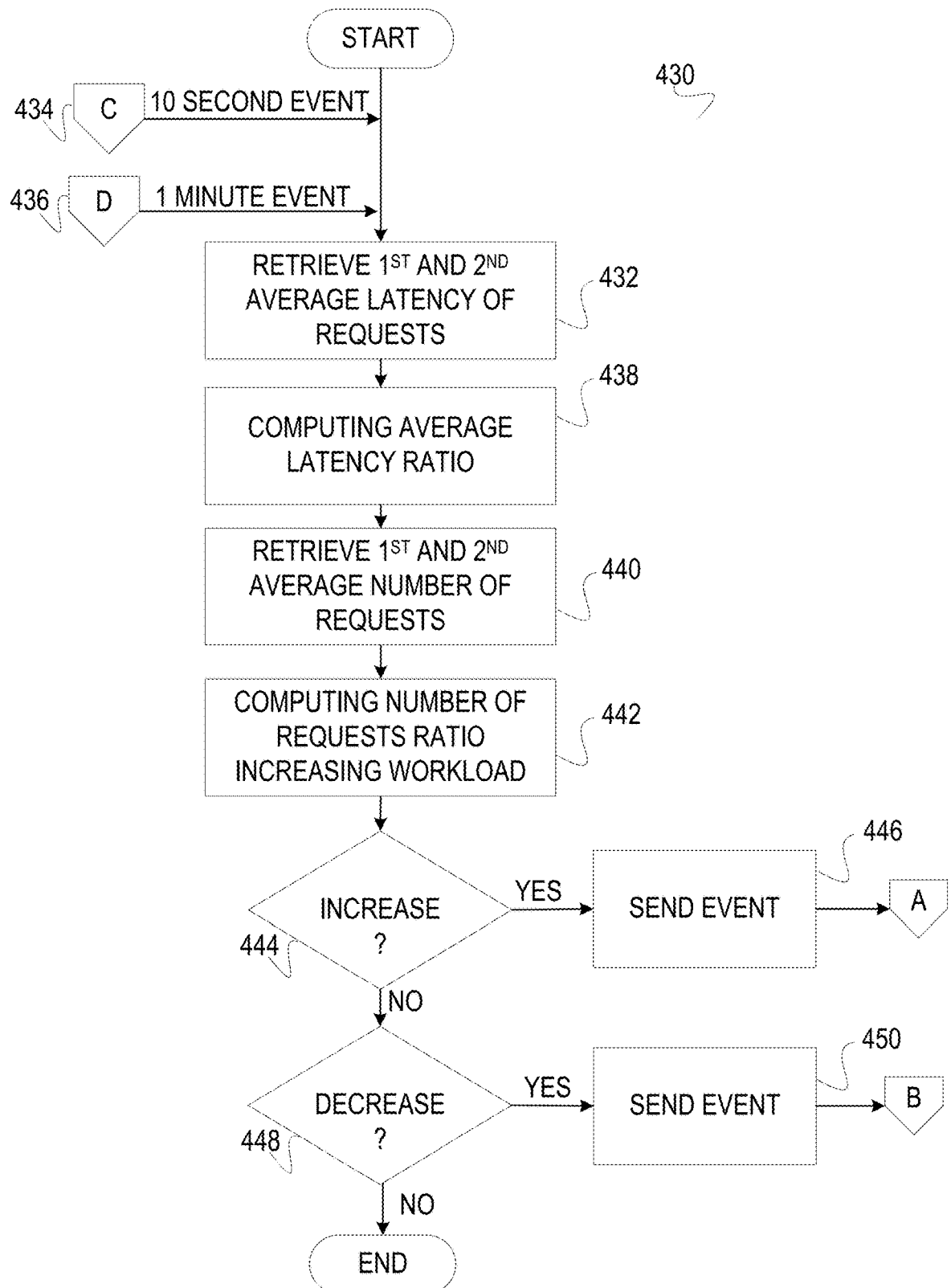
FIG. 6 is a block diagram illustrating a method, according to an embodiment, for resizing the thread pool.

FIG. 6 is a block diagram illustrating a method 430, according to an embodiment, to resize the thread pool. The method 430 commences, at operation 432, at the local server 124, with the thread pool manager retrieving the two most recent samples of the average latency of requests 182. For example, as illustrated in FIG. 1F, the thread pool manager may utilize current sample identifier 174 to retrieve the average latency of requests 182 (ALR$_1$) at the subsequent sample 186 for TIME-50" and the average latency of requests 182 (ALR$_2$) at the subsequent sample 186 for TIME-40" from the moving average 171. The thread pool manager executes the operation 432 responsive to receiving a triggering event. For example, at off-page connecter 434 "C," the thread pool manager may receive a triggering event indicating a ten-second sample was aggregated. Accordingly, the thread pool manager responds to the triggering event, at operation 432, by utilizing the current sample identifier 174 associated with the moving average 171 that stores ten-second samples. Also, for example, at off-page connecter 436 "D," the thread pool manager may receive a triggering event indicating a one-minute sample was aggregated. Accordingly, the thread pool manager responds to the triggering event for the one-minute sample, at operation 432, by utilizing the current sample identifier 174 associated with the moving average 171 that stores one-minute samples. At operation 438, the thread pool manager computes the average latency ratio 191 based on the average latency of requests 182 (ALR$_1$) and average latency of requests 182 (ALR$_2$) that were retrieved.

At operation 440, the thread pool manager retrieves the two most recent samples of the average number of requests 184. For example, the thread pool manager may utilize current sample identifier 174 to retrieve the average number of requests 184 (ANOR$_1$), at the subsequent sample 186 (e.g., sample) TIME-50," and the average number of requests 184 (ANOR$_2$), at the subsequent sample 186 identified TIME-40," from the moving average 171 illustrated in FIG. 1F. At operation 442, The thread pool manager computes the average number of requests ratio 193 and the increasing workload 195 based on the average number of requests 184 (ANOR$_1$) and average number of requests 184 (ANOR$_2$) that were retrieved.

At decision operation 444, the thread pool manager identifies whether the condition for increasing the size of the thread pool 156 is TRUE. If the condition for increasing the size of the thread pool 156 is TRUE, then processing continues at operation 446. Otherwise processing continues at decision operation 448. At operation 446, the thread pool manager increases maximum threads 212, as previously described in association with FIG. 1G, and sends an event to the agent server that indicates the maximum size of the thread pool 156 has been increased (see FIG. 3A, at off-page connector "A").

At decision operation 448, the thread pool manager identifies whether the condition for decreasing the size of the thread pool 156 is TRUE. If the condition for decreasing the size of the thread pool is TRUE, then processing continues at operation 450. Otherwise processing ends. At operation 450, the thread pool manager decreases maximum threads 212, as previously described in association with FIG. 1F, and sends an event to the agent server that indicates the maximum size of the thread pool 156 has been decreased (see FIG. 3B, off-page connector "B").

Adaptive Throttling for a Source Host

According to an embodiment, systems, methods, and machine storage mediums for adaptive throttling for a source host are described. An example system may comprise: executing a job, at a backup host, to back up a file set from a source host responsive to a triggering event, the backing up of the file set including fetching metadata from the source host; communicating, in parallel, one or more requests, over a network, to the source host by utilizing one or more threads from a thread pool, the communicating the one or more requests including communicating a first request, over the network, to the source host by utilizing a first thread to fetch a first metadata item, the first request being based on a file sharing protocol and an operation set, the first request including a first operation; receiving responses, over the network, corresponding to the one or more requests by utilizing the one or more threads, the receiving the responses including receiving a first response corresponding to the first request by utilizing the first thread, the first response including the first metadata item; processing the responses including processing the first response, comprising: generating a first latency based on the first response, and incrementing a number of requests based on the first response; aggregating samples responsive to a timeout, the samples including the first latency and the number of requests; resizing the thread pool based on the aggregating; and backing up the file set from the source host based on the metadata.

The example system described above, wherein the file sharing protocol is Network File System protocol and the operation set is a Unix operation set. The example system described above, wherein the file sharing protocol is Server Message Block protocol and the operation set is a Windows operation set. The example system described above, wherein the first request includes the first operation, for execution on the source host, to generate the first metadata item. The example system described above, wherein the generating the first latency further comprises: identifying a receive time responsive to the first thread receiving the first response; subtracting a transmit time from the receive time to generate the first latency; and storing the first latency in a first sample in a first moving average including a first plurality of samples. The example system described above, wherein the aggregating the samples further comprises: aggregating the first latency over the first plurality of samples to generate a first average latency of requests; storing the first average latency of requests in a first sample in a second moving average including a second plurality of samples; aggregating the number of requests over the first plurality of samples to generate a first average number of requests; and storing the first average number of requests in a first sample in the second moving average including the second plurality of samples. The example system described above, wherein the resizing further comprises computing an average latency ratio based on the first average latency of requests and the second average latency of requests; and computing a number of requests ratio based on the first average number of requests and the second average number of requests. The example system described above, wherein the resizing further comprises increasing a size of the thread pool responsive to identifying the average number of requests ratio as being greater than the average latency ratio and wherein the increasing the size of the thread pool includes increasing the size of the thread pool by one thread. The example system described above, wherein the resizing further comprises decreasing a size of the thread pool responsive to identifying the average number of requests ratio as being less than the average latency ratio and wherein the decreasing the size of the thread pool includes decreasing the thread pool by a percentage of the size of the thread pool and wherein the percentage is configurable.

An example method may comprise: executing a job, at a backup host, to back up a file set from a source host responsive to a triggering event, the backing up of the file set including fetching metadata from the source host; communicating, in parallel, one or more requests, over a network, to the source host by utilizing one or more threads from a thread pool, the communicating the one or more requests including communicating a first request, over the network, to the source host by utilizing a first thread to fetch a first metadata item, the first request being based on a file sharing protocol and an operation set, the first request including a first operation; receiving responses, over the network, corresponding to the one or more requests by utilizing the one or more threads, the receiving the responses including receiving a first response corresponding to the first request by utilizing the first thread, the first response including the first metadata item; processing the responses including processing the first response, comprising: generating a first latency based on the first response, and incrementing a number of requests based on the first response; aggregating samples responsive to a timeout, the samples including the first latency and the number of requests; resizing the thread pool based on the aggregating; and backing up the file set from the source host based on the metadata. The example method above, wherein the file sharing protocol is Network File System protocol and the operation set is a Unix operation set. The example method above, wherein the file sharing protocol is Server Message Block protocol and the operation set is a Windows operation set. The example method above, wherein the first request includes the first operation, for execution on the source host, to generate the first metadata item. The example method above, wherein the generating the first latency further comprises: identifying a receive time responsive to the first thread receiving the first response; subtracting a transmit time from the receive time to generate the first latency; and storing the first latency in a first sample in a first moving average including a first plurality of samples. The example method above, wherein the aggregating the samples further comprises: aggregating the first latency over the first plurality of samples to generate a first average latency of requests; storing the first average latency of requests in a first sample in a second moving average including a second plurality of samples; aggregating the number of requests over the first plurality of samples to generate a first average number of requests; and storing the first average number of requests in a first sample in the second moving average including the second plurality of samples. The example method above, wherein the resizing further comprises computing an average latency ratio based on the first average latency of requests and the second average latency of requests; and computing a number of requests ratio based on the first average number of requests and the second average number of requests. The example method above, wherein the resizing further comprises increasing a size of the thread pool responsive to identifying the average number of requests ratio as being greater than the average latency ratio and wherein the increasing the size of the thread pool includes increasing the size of the thread pool by one thread. The example method above, wherein the resizing further comprises decreasing a size of the thread pool responsive to identifying the average number of requests ratio as being less than the average latency ratio and wherein the decreasing the size of the thread pool includes decreasing the thread pool by a percentage of the size of the thread pool and wherein the percentage is configurable.

An example machine-storage medium may comprise the machine-storage medium and storing a set of instructions that, when executed by a processor, causes a machine to perform operations comprising: executing a job, at a backup host, to back up a file set from a source host responsive to a triggering event, the backing up of the file set including fetching metadata from the source host; communicating, in parallel, one or more requests, over a network, to the source host by utilizing one or more threads from a thread pool, the communicating the one or more requests including communicating a first request, over the network, to the source host by utilizing a first thread to fetch a first metadata item, the first request being based on a file sharing protocol and an operation set, the first request including a first operation; receiving responses, over the network, corresponding to the one or more requests by utilizing the one or more threads, the receiving the responses including receiving a first response corresponding to the first request by utilizing the first thread, the first response including the first metadata item; processing the responses including processing the first response, comprising: generating a first latency based on the first response, and incrementing a number of requests based on the first response; aggregating samples responsive to a timeout, the samples including the first latency and the number of requests; resizing the thread pool based on the aggregating; and backing up the file set from the source host based on the metadata.

The example machine-storage medium above, wherein the file sharing protocol is Network File System protocol and the operation set is a Unix operation set.

Adaptive Throttling Communication Protocol

According to an embodiment, systems, methods, and machine storage mediums for an adaptive throttling communication protocol are described. An example system may comprise: at least one processor and memory having instructions that, when executed, cause the at least one processor to perform operations comprising: communicating, in parallel, one or more requests, over a network, from a first host to a second host by utilizing one or more threads from a thread pool, the communicating the one or more requests including communicating a first request, over the network, to the second host by utilizing a first thread to fetch a first portion of data, the first request being based on a file sharing protocol and an operation set, the first request including a first operation; receiving responses, over the network, corresponding to the one or more requests by utilizing the one or more threads, the receiving the responses including receiving a first response corresponding to the first request by utilizing the first thread, the first response including the first portion of data; processing the responses including processing the first response, comprising: generating a first latency based on the first response, and incrementing a number of requests based on the first response; aggregating samples responsive to a timeout, the samples including the first latency and the number of requests; and resizing the thread pool based on the aggregating.

The example system above, wherein the file sharing protocol is Network File System protocol and the operation set is a Unix operation set. The example system above, wherein the file sharing protocol is Server Message Block protocol and the operation set is a Windows operation set. The example system above, wherein the first request includes the first operation, for execution on the second host, to generate a portion of the data. The example system above, wherein the generating the first latency further comprises: identifying a receive time responsive to the first thread receiving the first response; subtracting a transmit time from the receive time to generate the first latency; and storing the first latency in a first sample in a first moving average including a first plurality of samples. The example system above, wherein the aggregating the samples further comprises: aggregating the first latency over the first plurality of samples to generate a first average latency of requests; storing the first average latency of requests in a first sample in a second moving average including a second plurality of samples; aggregating the number of requests over the first plurality of samples to generate a first average number of requests; and storing the first average number of requests in a first sample in the second moving average including the second plurality of samples. The example system above, wherein the resizing further comprises computing an average latency ratio based on the first average latency of requests and the second average latency of requests; and computing a number of requests ratio based on the first average number of requests and the second average number of requests. The example system above, wherein the resizing further comprises increasing a size of the thread pool responsive to identifying the average number of requests ratio as being greater than the average latency ratio and wherein the increasing the size of the thread pool includes increasing the size of the thread pool by one thread. The example system above, wherein the resizing further comprises decreasing a size of the thread pool responsive to identifying the average number of requests ratio as being less than the average latency ratio and wherein the decreasing the size of the thread pool includes decreasing the thread pool by a percentage of the size of the thread pool and wherein the percentage is configurable.

An example method comprising: communicating, in parallel, one or more requests, over a network, from a first host to a second host by utilizing one or more threads from a thread pool, the communicating the one or more requests including communicating a first request, over the network, to the second host by utilizing a first thread to fetch a first portion of data, the first request being based on a file sharing protocol and an operation set, the first request including a first operation; receiving responses, over the network, corresponding to the one or more requests by utilizing the one or more threads, the receiving the responses including receiving a first response corresponding to the first request by utilizing the first thread, the first response including the first portion of data; processing the responses including processing the first response, comprising: generating a first latency based on the first response, and incrementing a number of requests based on the first response; aggregating samples responsive to a timeout, the samples including the first latency and the number of requests; and resizing the thread pool based on the aggregating.

The example method above, wherein the file sharing protocol is Network File System protocol and the operation set is a Unix operation set. The example method above, wherein the file sharing protocol is Server Message Block protocol and the operation set is a Windows operation set. The example method above, wherein the first request includes the first operation, for execution on the second host, to generate a portion of the data. The example method above, wherein the generating the first latency further comprises: identifying a receive time responsive to the first thread receiving the first response; subtracting a transmit time from the receive time to generate the first latency; and storing the first latency in a first sample in a first moving average including a first plurality of samples. The example method above, wherein the aggregating the samples further comprises: aggregating the first latency over the first plurality of samples to generate a first average latency of requests; storing the first average latency of requests in a first sample in a second moving average including a second plurality of samples; aggregating the number of requests over the first plurality of samples to generate a first average number of requests; and storing the first average number of requests in a first sample in the second moving average including the second plurality of samples. The example method above, wherein the resizing further comprises computing an average latency ratio based on the first average latency of requests and the second average latency of requests; and computing a number of requests ratio based on the first average number of requests and the second average number of requests. The example method above, wherein the resizing further comprises increasing a size of the thread pool responsive to identifying the average number of requests ratio as being greater than the average latency ratio and wherein the increasing the size of the thread pool includes increasing the size of the thread pool by one thread. The example method above, wherein the resizing further comprises decreasing a size of the thread pool responsive to identifying the average number of requests ratio as being less than the average latency ratio and wherein the decreasing the size of the thread pool includes decreasing the thread pool by a percentage of the size of the thread pool and wherein the percentage is configurable.

An example machine-storage medium for storing a set of instructions that, when executed by a processor, causes a machine to perform operations comprising: communicating, in parallel, one or more requests, over a network, from a first host to a second host by utilizing one or more threads from a thread pool, the communicating the one or more requests including communicating a first request, over the network, to the second host by utilizing a first thread to fetch a first portion of data, the first request being based on a file sharing protocol and an operation set, the first request including a first operation; receiving responses, over the network, corresponding to the one or more requests by utilizing the one or more threads, the receiving the responses including receiving a first response corresponding to the first request by utilizing the first thread, the first response including the first portion of data; processing the responses including processing the first response, comprising: generating a first latency based on the first response, and incrementing a number of requests based on the first response; aggregating samples responsive to a timeout, the samples including the first latency and the number of requests; and resizing the thread pool based on the aggregating.

The example machine-storage medium above, wherein the file sharing protocol is Network File System protocol and the operation set is a Unix operation set.

Figure 7A:
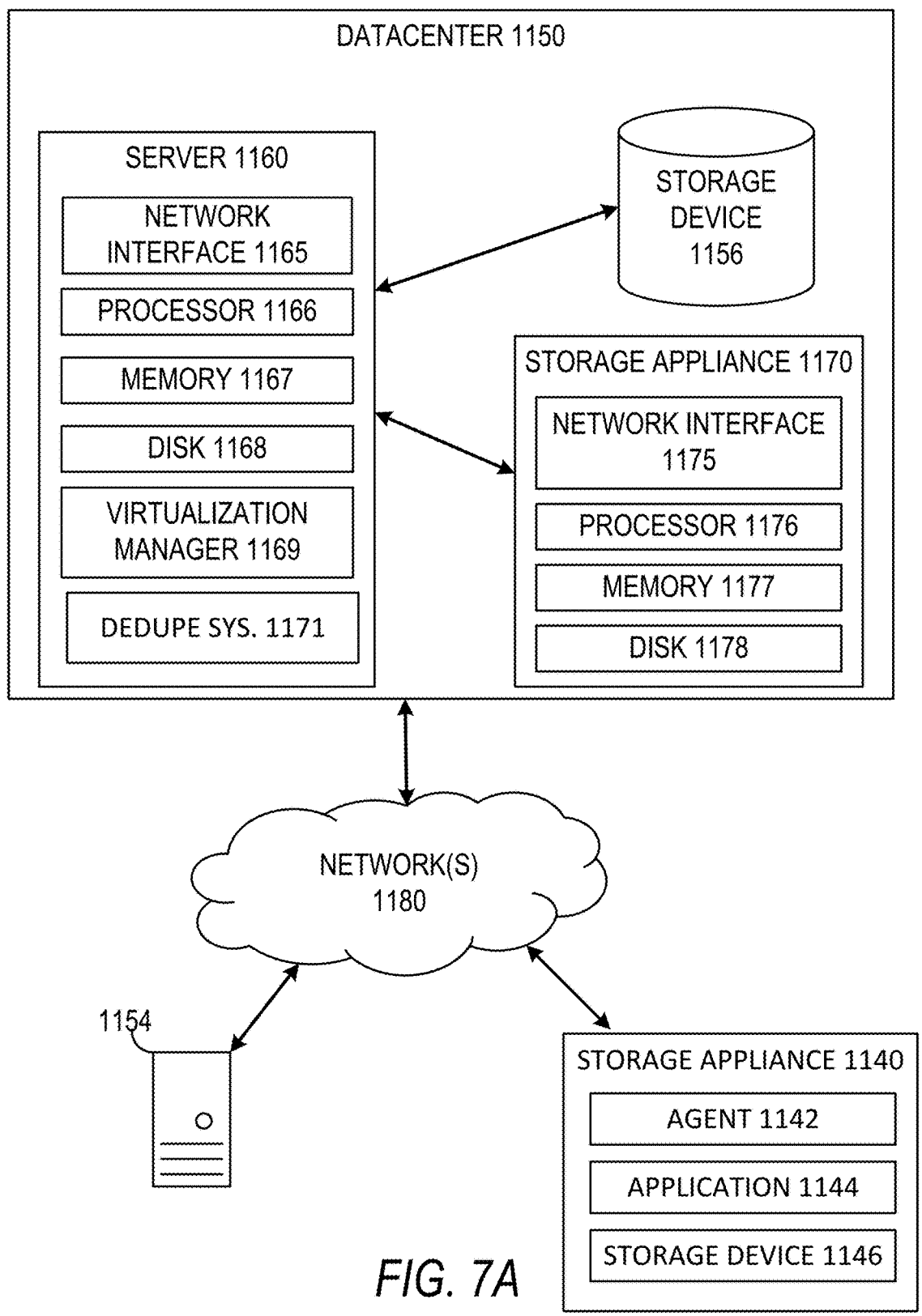
FIG. 7A is a block diagram illustrating a networked computing environment, according to an embodiment.

FIG. 7A depicts one embodiment of a networked computing environment 1100 in which the disclosed technology may be practiced. As depicted, the networked computing environment 1100 includes a datacenter 1150, a storage appliance 1140, and a computing device 1154 in communication with each other via one or more networks 1180. The networked computing environment 1100 may include a plurality of computing devices interconnected through one or more networks 1180. The one or more networks 1180 may allow computing devices and/or storage devices to connect to and communicate with other computing devices and/or other storage devices. In some cases, the networked computing environment 1100 may include other computing devices and/or other storage devices not shown. The other computing devices may include, for example, a mobile computing device, a non-mobile computing device, a server, a work-station, a laptop computer, a tablet computer, a desktop computer, or an information processing system. The other storage devices may include, for example, a storage area network storage device, a networked-attached storage device, a hard disk drive, a solid-state drive, or a data storage system.

The datacenter 1150 may include one or more servers, such as server 1160, in communication with one or more storage devices, such as storage device 1156. The one or more servers 1160 may also be in communication with one or more storage appliances, such as storage appliance 1170. The server 1160, storage device 1156, and storage appliance 1170 may be in communication with each other via a networking fabric connecting servers and data storage units within the datacenter 1150 to each other. The storage appliance 1170 may include a data management system for backing up virtual machines and/or files within a virtualized infrastructure. The server 1160 may be used to create and manage one or more virtual machines associated with a virtualized infrastructure.

The one or more virtual machines may run various applications, such as a database application or a web server. The storage device 1156 may include one or more hardware storage devices for storing data, such as a hard disk drive (HDD), a magnetic tape drive, a solid-state drive (SSD), a storage area network (SAN) storage device, or a networked attached storage (NAS) device. In some cases, a data center, such as datacenter 1150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 1180 may include a secure network such as an enterprise private network, an unsecure network such as a wireless open network, a local area network (LAN), a wide area network (WAN), and the Internet. The one or more networks 1180 may include a cellular network, a mobile network, a wireless network, or a wired network. Each network of the one or more networks 1180 may include hubs, bridges, routers, switches, and wired transmission media such as a direct-wired connection. The one or more networks 1180 may include an extranet or other private network for securely sharing information or providing controlled access to applications or files.

A server, such as server 1160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 1160 includes a network interface 1165, processor 1166, memory 1167, disk 1168, a virtualization manager 1169, and a deduplication system 1171 (e.g., lightweight deduplication system) all in communication with each other. Network interface 1165 allows server 1160 to connect to one or more networks 1180. Network interface 1165 may include a wireless network interface and/or a wired network interface. Processor 1166 allows server 1160 to execute computer-readable instructions stored in memory 1167 in order to perform processes described herein. Processor 1166 may include one or more processing units, such as one or more CPUs and/or one or more GPUs. Memory 1167 may comprise one or more types of memory (e.g., RAM, SRAM, DRAM, ROM, EEPROM, Flash, etc.). Disk 1168 may include a hard disk drive and/or a solid-state drive. Memory 1167 and disk 1168 may comprise hardware storage devices.

The virtualization manager 1169 may manage a virtualized infrastructure and perform management operations associated with the virtualized infrastructure. The virtualization manager 1169 may manage the provisioning of virtual machines running within the virtualized infrastructure and provide an interface to computing devices interacting with the virtualized infrastructure. In one example, the virtualization manager 1169 may set a virtual machine into a frozen state in response to a snapshot request made via an application programming interface (API) by a storage appliance, such as storage appliance 1170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 1169 may then transfer data associated with the virtual machine (e.g., an image of the virtual machine or a portion of the image of the virtual disk file associated with the state of the virtual disk at the point-in-time from which it is frozen) to a storage appliance in response to a request made by the storage appliance. After the data associated with the point-in-time snapshot of the virtual machine has been transferred to the storage appliance 1170, the virtual machine may be released from the frozen state (i.e., unfrozen) and the updates made to the virtual machine and stored in the separate file may be merged into the virtual disk file. The virtualization manager 1169 may perform various virtual machine-related tasks, such as cloning virtual machines, creating new virtual machines, monitoring the state of virtual machines, and moving virtual machines.

The lightweight deduplication system 1171 is configured to implement efficient deduplication approaches, as discussed in further detail below. Although the lightweight deduplication system 1171 is illustrated as operating on the server 1160, it is appreciated that the lightweight deduplication system 1171 may be integrated and run on other devices of the networked computing environment 1100, including, for example on storage appliance 1140 or storage appliance 1170.

One embodiment of storage appliance 1170 includes a network interface 1175, processor 1176, memory 1177, and disk 1178 all in communication with each other. Network interface 1175 allows storage appliance 1170 to connect to one or more networks 1180. Network interface 1175 may include a wireless network interface and/or a wired network interface. Processor 1176 allows storage appliance 1170 to execute instructions stored in memory 1177 in order to perform processes described herein. Processor 1176 may include one or more processing units, such as one or more CPUs and/or one or more GPUs. Memory 1177 may comprise one or more types of memory (e.g., RAM, SRAM, DRAM, ROM, EEPROM, NOR Flash, NAND Flash, etc.). Disk 1178 may include a hard disk drive and/or a solid-state drive. Memory 1177 and disk 1178 may comprise hardware storage devices.

In one embodiment, the storage appliance 1170 may include four machines. Each of the four machines may include a multi-core CPU, 64 GB of RAM, a 400 GB SSD, three 4 TB HDDs, and a network interface controller. In this case, the four machines may be in communication with the one or more networks 1180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of a thousand virtual machines. The networked computing environment 1100 may provide a cloud computing environment for one or more computing devices. Cloud computing may refer to Internet-based computing, wherein shared resources, software, and/or information may be provided to one or more computing devices on-demand via the Internet. The networked computing environment 1100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 1100 may include a virtualized infrastructure that provides software, data processing, and/or data storage services to end users accessing the services via the networked computing environment 1100. In one example, networked computing environment 1100 may provide cloud-based work productivity or business-related applications to a computing device, such as computing device 1154. The storage appliance 1140 may comprise a cloud-based data management system for backing up virtual machines and/or files within a virtualized infrastructure, such as virtual machines running on server 1160 or files stored on server 1160 (e.g., locally stored files, files stored in mounted directories), according to some example embodiments.

In some cases, networked computing environment 1100 may provide remote access to secure applications and files stored within datacenter 1150 from a remote computing device, such as computing device 1154. The datacenter 1150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 1154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 1170 may manage the extraction and storage of virtual machine snapshots associated with different point-in-time versions of one or more virtual machines running within the datacenter 1150. A snapshot of a virtual machine may correspond with a state of the virtual machine at a particular point in time. In response to a restore command from the server 1160, the storage appliance 1170 may restore a point-in-time version of a virtual machine or restore point-in-time versions of one or more files located on the virtual machine and transmit the restored data to the server 1160. In response to a mount command from the server 1160, the storage appliance 1170 may allow a point-in-time version of a virtual machine to be mounted and allow the server 1160 to read and/or modify data associated with the point-in-time version of the virtual machine. To improve storage density, the storage appliance 1170 may deduplicate and compress data associated with different versions of a virtual machine and/or deduplicate and compress data associated with different virtual machines. To improve system performance, the storage appliance 1170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current-day incremental files or incremental files corresponding with snapshots captured within the past twenty-four hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 1170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 1170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 1170 may run a NFS server and make the particular version (or a copy of the particular version) of the virtual machine accessible for reading and/or writing. The end user of the storage appliance 1170 may then select the particular version to be mounted and run an application (e.g., a data analytics application) using the mounted version of the virtual machine. In another example, the particular version may be mounted as an iSCSI target.

In some example embodiments, the storage appliance 1140 is an external network-connected database appliance comprising an agent 1142, an application 1144, and a storage device 1146. In some example embodiments, the agent 1142 (e.g., backup agent 168) may be uploaded from the datacenter 1150 and installed on the storage appliance 1140. After installation on the storage appliance 1140, the agent 1142 may be enabled or disabled by the storage appliance 1140 over time. The agent 1142 may acquire one or more electronic files or snapshot information associated with the one or more electronic files from the application 1144. The snapshot information may include full and/or differential snapshot data. In one example, the one or more electronic files may comprise a database file for a database and the snapshot information may comprise a differential backup of the database file.

In those embodiments in which the application 1144 is a database application that manages a database, the agent 1142 is configured to acquire one or more electronic files corresponding with a first point-in-time version of the database from the database application. The agent 1142 can further acquire a database file for the database from the application 1144 or acquire a full or differential backup of the database from the computing application 1144. The determination of whether the agent 1142 acquires the database file or the full or differential backup may depend on a file size of the database file. The database file may comprise a text file or a binary file. The agent 1142 may transfer one or more changed data blocks corresponding with the first point-in-time version of the database to the storage appliance 1140.

In some example embodiments, the agent 1142 is further configured to interface with application 1144 or storage device 1146 to implement changes, such as creating directories, database instances, reads/writes, and other operations to provide database management functions between the storage appliance 1140 and devices within datacenter 1150. For example, the application 1144 can be a relational database management application with plugin functionality, in which third-party developed plugins or extensions can be integrated in the application 1144 to perform actions, such as creation of a database instance.

In some example embodiments, the application 1144 is a database application for managing a database (e.g., Oracle database management system) that can store database data locally on storage device 1146, or on remote storage locations, such as within datacenter 1150. The agent 1142 is a remote connection system for performing snapshots of database data (e.g., databases managed by application 1144), and can further implement bootstrapping, upgrade, and further include backup features to transfer data from the storage appliance 1140 to datacenter 1150 via networks 1180.

According to an embodiment, the storage appliance 1140 may be embodied as the source host 106. In this embodiment, multiple storage appliances 1140 may be clustered together to form a clustered database. For example, an Oracle host with a RAC cluster may be embodied in multiple storage appliances 1140. According to an embodiment, the storage appliance 1140 may be embodied as the remote server coupled to the storage device 117. In this embodiment, multiple storage appliances 1140 may be clustered together to form a clustered database. For example, an Oracle host with a RAC cluster may be embodied in multiple storage appliances 1140. According to an embodiment, the storage appliance 1170 may be embodied as the backup host 104. In this embodiment, multiple storage appliances 1170 may be clustered together to form a clustered database, as previously described.

Figure 7B:
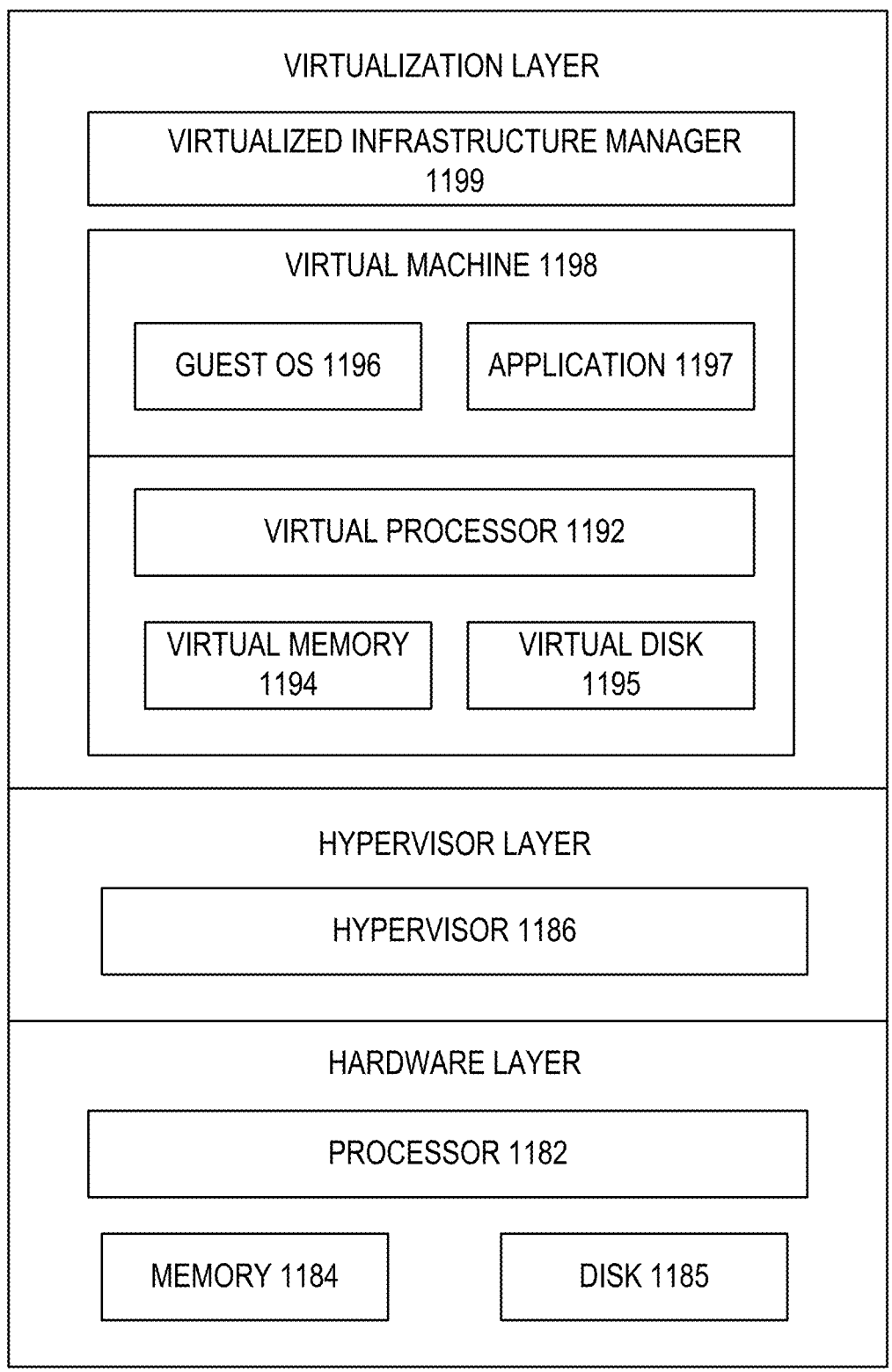
FIG. 7B is a block diagram illustrating a server, according to an embodiment.

FIG. 7B depicts one embodiment of server 1160 in FIG. 7A. The server 1160 may comprise one server out of a plurality of servers that are networked together within a data center (e.g., datacenter 1150). In one example, the plurality of servers may be positioned within one or more server racks within the data center. As depicted, the server 1160 includes hardware-level components and software-level components. The hardware-level components include one or more processors 1182, one or more memory 1184, and one or more disks 1185. The software-level components include a hypervisor 1186, a virtualized infrastructure manager 1199, and one or more virtual machines, such as virtual machine 1198. The hypervisor 1186 may comprise a native hypervisor or a hosted hypervisor. The hypervisor 1186 may provide a virtual operating platform for running one or more virtual machines, such as virtual machine 1198. Virtual machine 1198 includes a plurality of virtual hardware devices including a virtual processor 1192, a virtual memory 1194, and a virtual disk 1195. The virtual disk 1195 may comprise a file stored within the one or more disks 1185. In one example, a virtual machine 1198 may include a plurality of virtual disks, with each virtual disk of the plurality of virtual disks associated with a different file stored on the one or more disks 1185. Virtual machine 1198 may include a guest operating system 1196 that runs one or more applications, such as application 1197.

The virtualized infrastructure manager 1199, which may correspond with the virtualization manager 1169 in FIG. 7A, may run on a virtual machine or natively on the server 1160. The virtualized infrastructure manager 1199 may provide a centralized platform for managing a virtualized infrastructure that includes a plurality of virtual machines. The virtualized infrastructure manager 1199 may manage the provisioning of virtual machines running within the virtualized infrastructure and provide an interface to computing devices interacting with the virtualized infrastructure. The virtualized infrastructure manager 1199 may perform various virtualized infrastructure-related tasks, such as cloning virtual machines, creating new virtual machines, monitoring the state of virtual machines, and facilitating backups of virtual machines.

In one embodiment, the server 1160 may use the virtualized infrastructure manager 1199 to facilitate backups for a plurality of virtual machines (e.g., eight different virtual machines) running on the server 1160. Each virtual machine running on the server 1160 may run its own guest operating system and its own set of applications. Each virtual machine running on the server 1160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 1140 in FIG. 7A or storage appliance 1170 in FIG. 7A, may request a snapshot of a virtual machine running on the server 1160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 1199 may set the virtual machine into a frozen state or store a copy of the virtual machine at the particular point in time. The virtualized infrastructure manager 1199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 1199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 1199 may transfer a portion of an image of the virtual machine associated with data that has changed since an earlier point in time prior to the particular point in time or since a last snapshot of the virtual machine was taken. In one example, the virtualized infrastructure manager 1199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 1199 may output one or more virtual data blocks associated with the virtual machine that have been modified between the first point in time and the second point in time.

In some embodiments, the server 1160 or the hypervisor 1186 may communicate with a storage appliance, such as storage appliance 1140 in FIG. 7A or storage appliance 1170 in FIG. 7A, using a distributed file system protocol such as NFS Version 3. The distributed file system protocol may allow the server 1160 or the hypervisor 1186 to access, read, write, or modify files stored on the storage appliance 1140/1170 as if the files were locally stored on the server 1160. The distributed file system protocol may allow the server 1160 or the hypervisor 1186 to mount a directory or a portion of a file system located within the storage appliance 1140 or the storage appliance 1170. For example, the storage appliance 1140 can include a standalone host of a database, where the server 1160 mounts the database directories as if the files were locally stored on server 1160. Further, the server 1160 may function as a backup device for storage appliance 1140 by backing up data in the mounted directories in a distributed database within datacenter 1150, such as a cluster of nodes in storage appliance 1170.

Figure 7C:
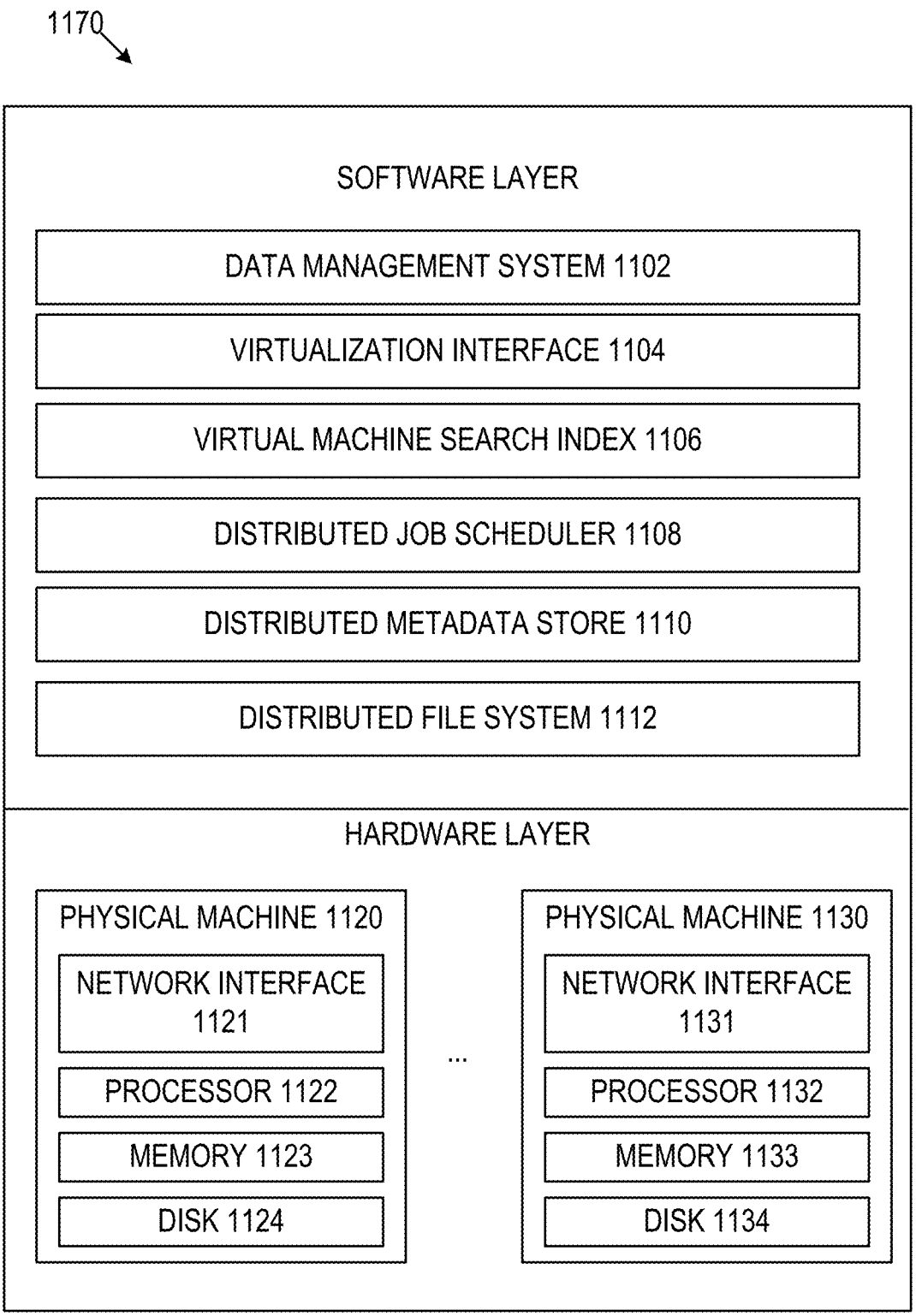
FIG. 7C is a block diagram illustrating a storage appliance, according to an embodiment.

FIG. 7C depicts one embodiment of storage appliance 1170 (e.g., server storage platform) in FIG. 7A. The storage appliance 1170 may include a plurality of physical machines that may be grouped together and presented as a single computing system. Each physical machine of the plurality of physical machines may comprise a node in a cluster (e.g., a failover cluster). In one example, the storage appliance 1170 may be positioned within a server rack within a data center. As depicted, the storage appliance 1170 includes hardware-level components and software-level components. The hardware-level components include one or more physical machines, such as physical machine 1120 and physical machine 1130. The physical machine 1120 includes a network interface 1121, processor 1122, memory 1123, and disk 1124 all in communication with each other. Processor 1122 allows physical machine 1120 to execute computer-readable instructions stored in memory 1123 to perform processes described herein. Disk 1124 may include a HDD and/or a SDD. The physical machine 1130 includes a network interface 1131, processor 1132, memory 1133, and disk 1134 all in communication with each other. Processor 1132 allows physical machine 1130 to execute computer-readable instructions stored in memory 1133 to perform processes described herein. Disk 1134 may include a HDD and/or a SSD. In some cases, disk 1134 may include a flash-based SSD or a hybrid HDD/SSD drive. In one embodiment, the storage appliance 1170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 1160 in FIG. 7A, or a hypervisor, such as hypervisor 1186 in FIG. 7B, to communicate with the storage appliance 1170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 1186 in FIG. 7B, may be configured with a first floating IP address associated with a first node in the cluster. The hypervisor may connect to the cluster using the first floating IP address. In one example, the hypervisor may communicate with the cluster using the NFS Version 3 protocol.

Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be (G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 7C, the software-level components of the storage appliance 1170 may include data management system 1102, a virtualization interface 1104, a distributed job scheduler 1108, a distributed metadata store 1110, a distributed file system 1112, and one or more virtual machine search indexes, such as virtual machine search index 1106. In one embodiment, the software-level components of the storage appliance 1170 may be run using a dedicated hardware-based appliance. In another embodiment, the software-level components of the storage appliance 1170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-50 shots/). A directory for each virtual machine protected using the storage appliance 1170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 1112 may present itself as a single file system, in which, as new physical machines or nodes are added to the storage appliance 1170, the cluster may automatically discover the additional nodes and automatically increase the available capacity of the file system for storing files and other data. Each file stored in the distributed file system 1112 may be partitioned into one or more chunks or shards. Each of the one or more chunks may be stored within the distributed file system 1112 as a separate file. The files stored within the distributed file system 1112 may be replicated or mirrored over a plurality of physical machines, thereby creating a load-balanced and fault-tolerant distributed file system. In one example, storage appliance 1170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 1110 may include a distributed database management system that provides high availability without a single point of failure. In one embodiment, the distributed metadata store 1110 may comprise a database, such as a distributed document-oriented database. The distributed metadata store 1110 may be used as a distributed key value storage system. In one example, the distributed metadata store 1110 may comprise a distributed NoSQL key value store database. In some cases, the distributed metadata store 1110 may include a partitioned row store, in which rows are organized into tables or other collections of related data held within a structured format within the key value store database. A table (or a set of tables) may be used to store metadata information associated with one or more files stored within the distributed file system 1112. The metadata information may include a metadata item 166, the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 1112 and metadata associated with the new file may be stored within the distributed metadata store 1110. The distributed metadata store 1110 may also be used to store a backup schedule for the virtual machine and a list of snapshots for the virtual machine that are stored using the storage appliance 1170.

In some cases, the distributed metadata store 1110 may be used to manage one or more versions of a virtual machine. Each version of the virtual machine may correspond with a full image snapshot of the virtual machine stored within the distributed file system 1112 or an incremental snapshot of the virtual machine (e.g., a forward incremental or reverse incremental) stored within the distributed file system 1112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 1108 (e.g., job module 152) may be used for scheduling backup jobs that acquire and store virtual machine snapshots for one or more virtual machines over time. The distributed job scheduler 1108 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 1108 may schedule a specific job to be run on a particular node based on data stored on the particular node. For example, the distributed job scheduler 1108 may schedule a virtual machine snapshot job to be run on a node in a cluster that is used to store snapshots of the virtual machine in order to reduce network congestion.

The distributed job scheduler 1108 may comprise a distributed fault-tolerant job scheduler, in which jobs affected by node failures are recovered and rescheduled to be run on available nodes. In one embodiment, the distributed job scheduler 1108 may be fully decentralized and implemented without the existence of a master node. The distributed job scheduler 1108 may run job scheduling processes on each node in a cluster or on a plurality of nodes in the cluster. In one example, the distributed job scheduler 1108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 1110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 1108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling back or undoing any actions or tasks performed by failed jobs. In one embodiment, the job scheduling processes may detect that a particular task for a particular job has failed and, in response, may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 1108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 1108 may ensure that each task of the series of tasks is executed based on the ordering of tasks. Tasks that do not have dependencies with each other may be executed in parallel.

In some cases, the distributed job scheduler 1108 may schedule each task of a series of tasks to be performed on a specific node in a cluster. In other cases, the distributed job scheduler 1108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 1108 may assign one or more tasks associated with a job to be executed on a particular node in a cluster based on the location of data required to be accessed by the one or more tasks.

In one embodiment, the distributed job scheduler 1108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 1199 in FIG. 7B, to create a frozen copy of the virtual machine and to transfer one or more chunks (or one or more files) associated with the frozen copy to a storage appliance, such as storage appliance 1170 in FIG. 7A. The one or more tasks may also include generating metadata for the one or more chunks, storing the metadata using the distributed metadata store 1110, storing the one or more chunks within the distributed file system 1112, and communicating with the virtualized infrastructure manager that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 1112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 1104 may provide an interface for communicating with a virtualized infrastructure manager managing a virtualization infrastructure, such as virtualized infrastructure manager 1199 in FIG. 7B, and requesting data associated with virtual machine snapshots from the virtualization infrastructure. The virtualization interface 1104 may communicate with the virtualized infrastructure manager using an API for accessing the virtualized infrastructure manager (e.g., to communicate a request for a snapshot of a virtual machine). In this case, storage appliance 1170 may request and receive data from a virtualized infrastructure without requiring agent software to be installed or running on virtual machines within the virtualized infrastructure. The virtualization interface 1104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 1106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 1106 may be used to identify a version of the virtual machine that includes a particular version of a file (e.g., a particular version of a database, a spreadsheet, or a word processing document). In some cases, each of the virtual machines that are backed up or protected using storage appliance 1170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 1112 in FIG. 7C. The data management system 1102 (e.g., processing module 154) may comprise an application running on the storage appliance that manages and stores one or more snapshots of a virtual machine. In one example, the data management system 1102 may comprise a highest-level layer in an integrated software stack running on the storage appliance. The integrated software stack may include the data management system 1102, the virtualization interface 1104, the distributed job scheduler 1108, the distributed metadata store 1110, and the distributed file system 1112.

In some cases, the integrated software stack may run on other computing devices, such as a server or computing device 1154 in FIG. 7A. The data management system 1102 may use the virtualization interface 1104, the distributed job scheduler 1108, the distributed metadata store 1110, and the distributed file system 1112 to manage and store one or more snapshots of a virtual machine. Each snapshot of the virtual machine may correspond with a point-in-time version of the virtual machine. The data management system 1102 may generate and manage a list of versions for the virtual machine. Each version of the virtual machine may map to or reference one or more chunks and/or one or more files stored within the distributed file system 1112. Combined together, the one or more chunks and/or the one or more files stored within the distributed file system 1112 may comprise a full image of the version of the virtual machine.

The modules, methods, engines, applications, and so forth described in conjunction with FIG. 1A-FIG. 6 are implemented in some embodiments in the context of multiple machines and associated software architectures. The sections below describe representative software architecture(s) and machine (e.g., hardware) architecture(s) that are suitable for use with the disclosed embodiment Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the disclosure in different contexts from the disclosure contained herein.

Figure 7D:
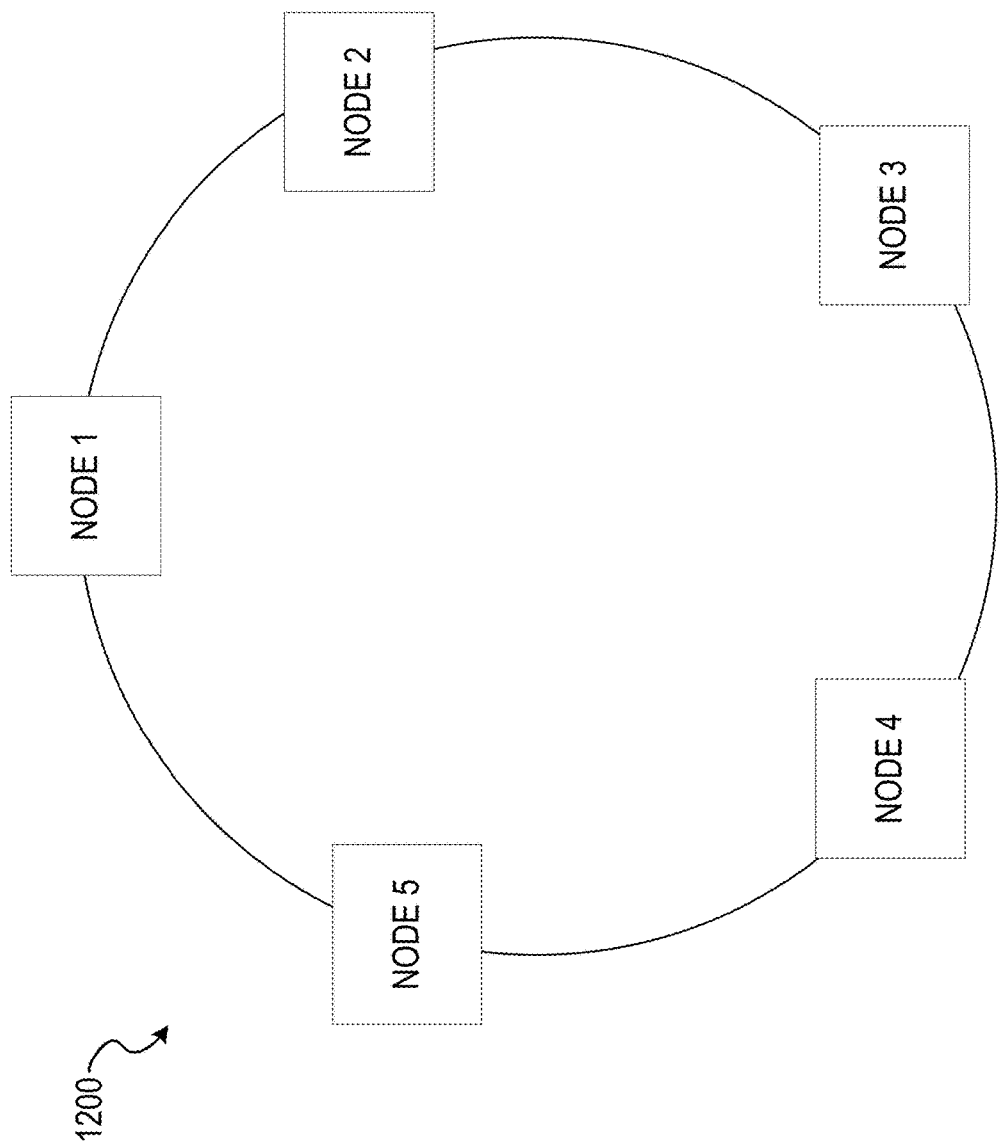
FIG. 7D is a block diagram illustrating a cluster, according to an embodiment.

FIG. 7D shows an example cluster 1200 of a distributed decentralized database, according to some example embodiments. As illustrated, the example cluster 1200 includes five nodes, nodes 1-5. In some example embodiments, each of the five nodes runs from different machines, such as physical machine 1120 in FIG. 7C or virtual machine 1198 in FIG. 7B. The nodes in the cluster 1200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the cluster 1200 in shards or chunks and decentralized in that there is no central storage device and therefore no single point of failure. The system operates under an assumption that multiple nodes may go down, up, or become nonresponsive, and so on. Sharding is splitting up of the data horizontally and managing each separately on different nodes. For example, if the data managed by the cluster 1200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the cluster 1200. For example, data written to node 1 can be replicated to nodes 2 and 3. If node 1 prematurely terminates, node 2 and/or 3 can be used to provide the replicated data. In some example embodiments, each node of cluster 1200 frequently exchanges state information about itself and other nodes across the cluster 1200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the cluster 1200.

Reading: Any node of cluster 1200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of cluster 1200 are configured to function the same way (e.g., as symmetrical peer database nodes that communicate via gossip protocol, such as Cassandra nodes)

with no single point of failure. If one of the nodes in cluster 1200 terminates prematurely ("goes down"), another node can rapidly take the place of the terminated node without disrupting service. The cluster 1200 can be a container for a keyspace, which is a container for data in the distributed decentralized database system (e.g., whereas a database is a container for containers in conventional relational databases, the Cassandra keyspace is a container for a Cassandra database system).

Figure 8:
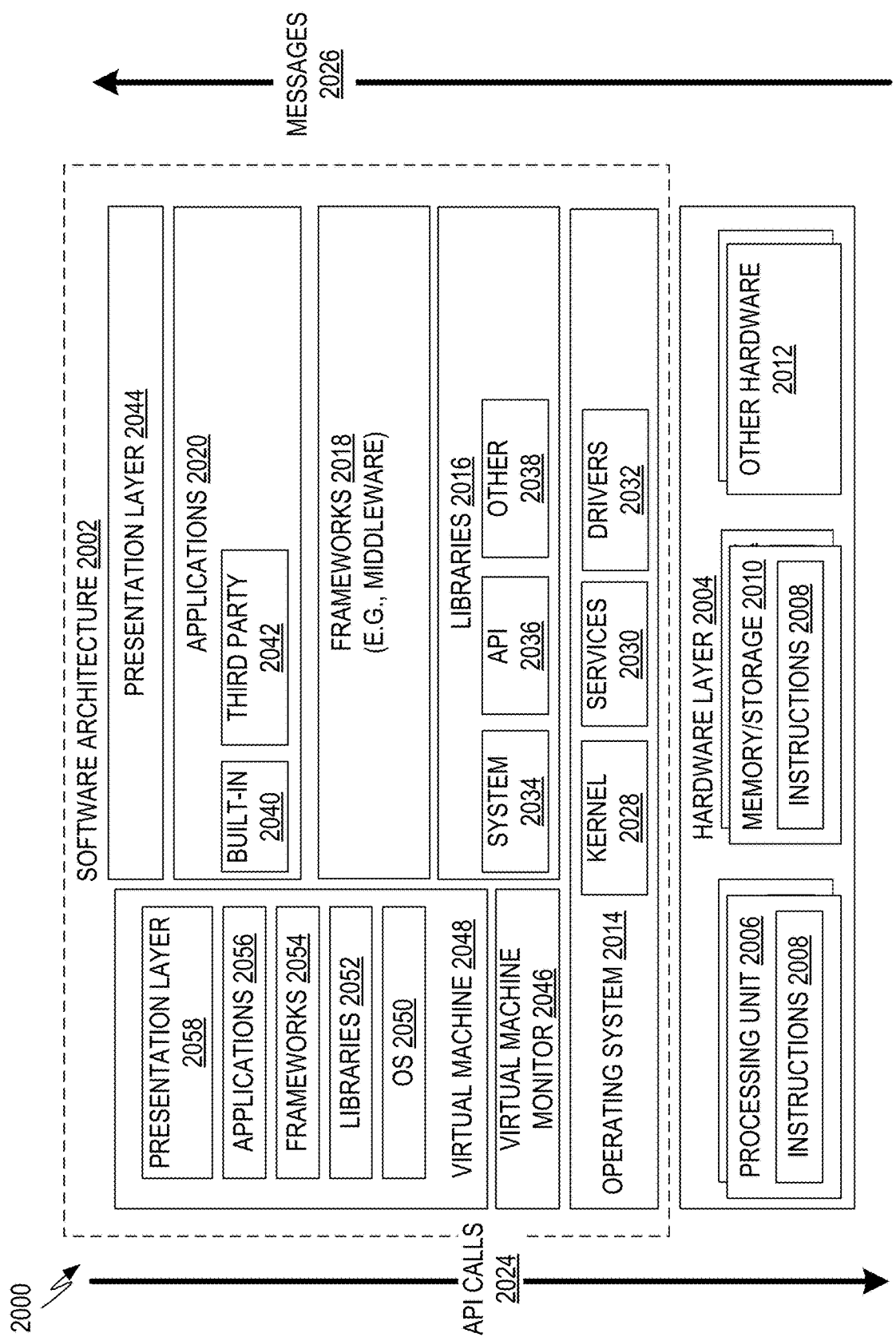
FIG. 8 is a block diagram illustrating a representative software architecture.

FIG. 8 is a block diagram 2000 illustrating a representative software architecture 2002, which may be used in conjunction with various hardware architectures herein described. FIG. 8 is merely a non-limiting example of a software architecture 2002, and it will be appreciated that many other architectures may be implemented to facilitate the functionality described herein. The software architecture 2002 may be executing on hardware such as a machine 2100 of FIG. 9 that includes, among other things, processors 2110, memory/storage 2130, and I/O components 2150. Returning to FIG. 8, a representative hardware layer 2004 is illustrated and can represent, for example, the machine 2100 of FIG. 9. The representative hardware layer 2004 comprises one or more processing units 2006 having associated executable instructions 2008. The executable instructions 2008 represent the executable instructions of the software architecture 2002, including implementation of the methods, engines, modules, and so forth of FIG. 1A-FIG. 6. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 8, the software architecture 2002 may be conceptualized as a stack of layers where each layer provides particular functionality. For example, the software architecture 2002 may include layers such as an operating system 2014, libraries 2016, frameworks 2018 (e.g., middleware), applications 2020, and a presentation layer 2044. Operationally, the applications 2020 and/or other components within the layers may invoke API calls 2024 through the software stack and receive a response, returned values, and so forth, illustrated as messages 2026, in response to the API calls 2024. The layers illustrated are representative in nature, and not all software architectures have all layers. For example, some mobile or special-purpose operating systems 2014 may not provide a framework 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), AAC, AMR, joint photography experts group (JPG), or portable network graphics (PNG)), graphics libraries (e.g., an Open Graphics Library (OpenGL) framework that may be used to render 2D and 3D graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 (e.g., middleware) may provide various graphical user interface functions, high-level resource management, high-level location services, and so forth. The frameworks 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042. Examples of representative built-in applications 2040 may include, but are not limited to, a contacts application, a browser application, a book reader application, a location application, a media application, a messaging application, and/or a game application. Third-party applications 2042 may include any of the built-in applications as well as a broad assortment of other applications 2020. In a specific example, the third-party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third-party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 8, this is illustrated by a virtual machine 2048. The virtual machine 2048 creates a software environment where applications/modules can execute as if they were executing on a hardware machine (such as the machine 2100 of FIG. 9, for example). The virtual machine 2048 is hosted by a host operating system (e.g., operating system 2014 in FIG. 8) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Figure 9:
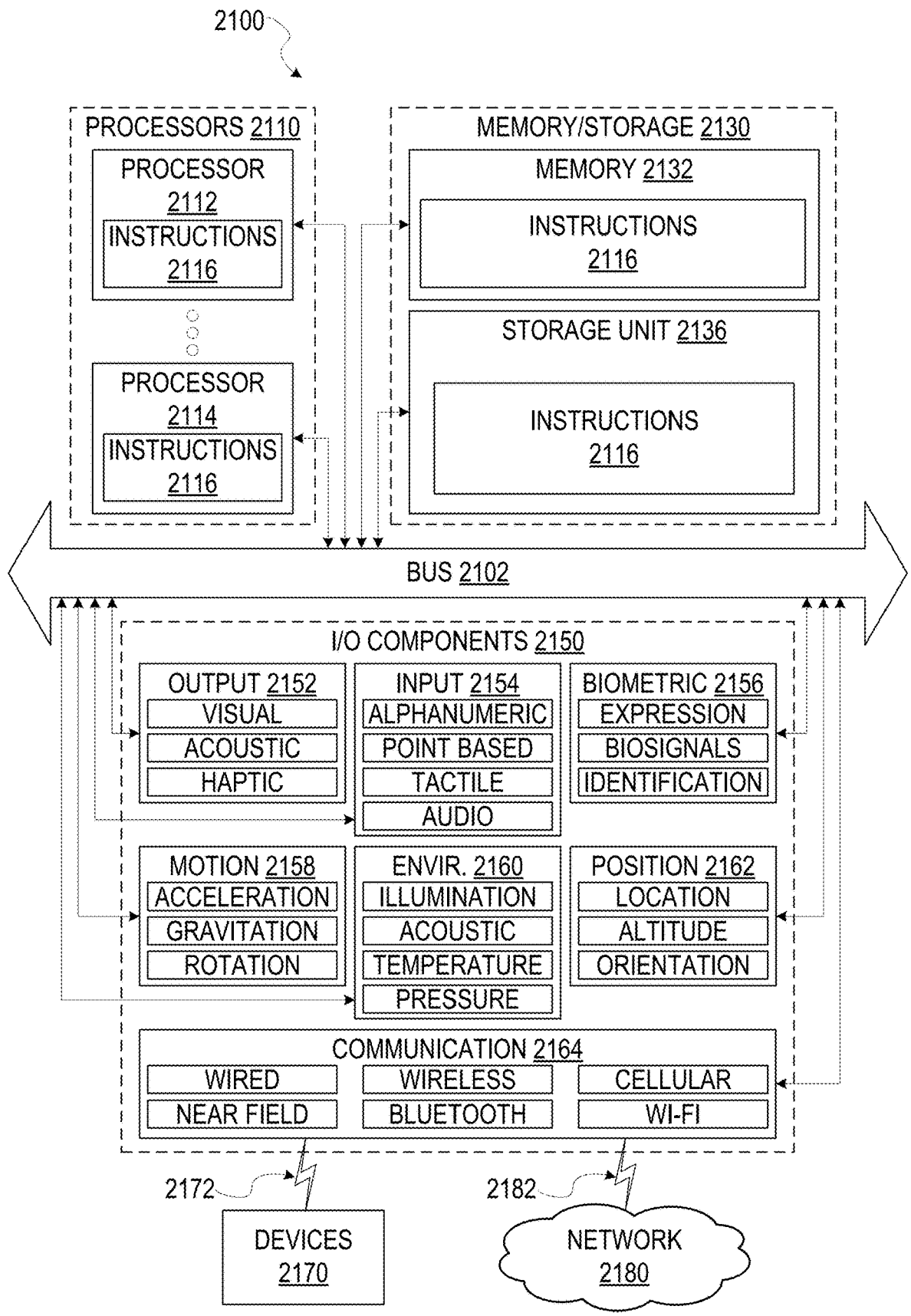
FIG. 9 is a block diagram illustrating components of a machine, according to some example embodiments.

FIG. 9 is a block diagram illustrating components of a machine 2100, according to some example embodiments, able to read instructions from a machine-storage medium and perform any one or more of the methodologies discussed herein. Specifically, FIG. 9 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may cause the machine 2100 to execute the flow diagrams of FIG. 3A-FIG. 6. Additionally, or alternatively, the instructions 2116 may implement the modules, engines, applications, and so forth, as described in this document. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a CPU, a reduced instruction set computing (RISC) processor, a complex instruction set computing (CISC) processor, a GPU, a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 9 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-storage media.

As used herein, "machine-storage medium" means a device able to store the instructions 2116 and data temporarily or permanently and may include, but not be limited to, RAM, ROM, buffer memory, flash memory, optical media, magnetic media, cache memory, other types of storage (e.g., EEPROM), and/or any suitable combination thereof. The term "machine-storage medium" should be taken to include a single medium or multiple media (e.g., a centralized or distributed database, or associated caches and servers) able to store the instructions 2116. The term "machine-storage medium" shall also be taken to include any medium, or combination of multiple media, that is capable of storing instructions (e.g., instructions 2116) for execution by a machine (e.g., machine 2100), such that the instructions 2116, when executed by one or more processors of the machine (e.g., processors 2110), cause the machine to perform any one or more of the methodologies described herein. Accordingly, a "machine-storage medium" refers to a single storage apparatus or device, as well as "cloud-based" storage systems or storage networks that include multiple storage apparatus or devices. The term "machine-storage medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 9. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172 respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via IP geolocation, location via Wi-Fi® signal triangulation, location via detecting an NFC beacon signal that may indicate a particular location, and so forth.

In various example embodiments, one or more portions of the network 2180 may be an ad hoc network, an intranet, an extranet, a VPN, a LAN, a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to the devices 2170.

The term "signal medium" or "transmission medium" shall be taken to include any intangible medium that is capable of storing, encoding, or carrying the instructions 2116 for execution by the machine 2100, and includes digital or analog communications signals or other intangible media to facilitate communication of such software.

The terms "machine-readable medium," "computer-readable medium," and "device-readable medium" mean the same thing and may be used interchangeably in this disclosure. The terms are defined to include both machine-storage media and transmission medium. Thus, the terms include both storage devices/media and carrier waves/modulated data signals.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor and memory having instructions that, when executed, cause the system to perform operations comprising:
   communicating a first request to a source host associated with a file set;
   utilizing a first thread of a thread pool to receive, from the source host, a first response corresponding to the first request, the first response including a first metadata item;
   identifying a first latency based on the first response;
   incrementing a quantity of requests based on the first response;
   aggregating samples based on the first latency and the quantity of requests;
   resizing the thread pool based on the aggregating; and
   backing up the file set from the source host based on the first metadata item.

2. The system of claim 1, wherein the instructions, when executed, cause the system to perform operations further comprising:
   executing a job, at a backup host, to back up the file set from the source host responsive to a triggering event, the backing up of the file set comprising fetching metadata from the source host;
   identifying, by the at least one processor, a first operation set from a plurality of operation sets responsive to identifying a file sharing protocol being utilized by the backup host and the source host, wherein the first operation set comprises a first operation; and
   communicating, in parallel, one or more requests to the source host, the communicating the one or more requests comprising communicating the first request to the source host.

3. The system of claim 2, wherein the file sharing protocol is Network File System protocol or Server Message Block protocol, and wherein the first operation set is a Unix operation set or a Windows operation set.

4. The system of claim 3, wherein the first request comprises the first operation, for execution on the source host, to generate the first metadata item.

5. The system of claim 1, wherein identifying the first latency further comprises:
   identifying a receive time responsive to the first thread receiving the first response;
   subtracting a transmit time from the receive time to generate the first latency; and
   storing the first latency in a first sample in a first moving average comprising a first plurality of samples.

6. The system of claim 5, wherein aggregating the samples further comprises:
   aggregating the first latency over the first plurality of samples to generate a first average latency of requests;
   storing the first average latency of requests in a first sample in a second moving average comprising a second plurality of samples;
   aggregating the quantity of requests over the first plurality of samples to generate a first average quantity of requests; and
   storing the first average quantity of requests in the first sample in the second moving average comprising the second plurality of samples.

7. The system of claim 6, wherein the resizing further comprises:
   computing an average latency ratio based on the first average latency of requests and a second average latency of requests; and
   computing an average quantity of requests ratio based on the first average quantity of requests and a second average quantity of requests.

8. The system of claim 7, wherein the resizing further comprises:
   increasing a size of the thread pool responsive to identifying the average quantity of requests ratio as being greater than the average latency ratio, wherein the increasing the size of the thread pool comprises increasing the size of the thread pool by one thread.

9. The system of claim 7, wherein the resizing further comprises:

decreasing a size of the thread pool responsive to identifying the average quantity of requests ratio as being less than the average latency ratio, wherein the decreasing the size of the thread pool comprises decreasing the thread pool by a percentage of the size of the thread pool, and wherein the percentage is configurable.

10. A method comprising:
communicating a first request to a source host associated with a file set;
utilizing a first thread of a thread pool to receive, from the source host, a first response corresponding to the first request, the first response comprising a first metadata item;
identifying a first latency based on the first response;
incrementing a quantity of requests based on the first response;
aggregating samples based on the first latency and the quantity of requests;
resizing the thread pool based on the aggregating; and
backing up the file set from the source host based on the first metadata item.

11. The method of claim 10, further comprising:
executing a job, at a backup host, to back up the file set from the source host responsive to a triggering event, the backing up of the file set comprising fetching metadata from the source host;
identifying, by at least one processor, a first operation set from a plurality of operation sets responsive to identifying a file sharing protocol being utilized by the backup host and the source host, wherein the first operation set comprises a first operation; and
communicating, in parallel, one or more requests to the source host, the communicating the one or more requests comprising communicating the first request to the source host.

12. The method of claim 11, wherein the file sharing protocol is Network File System protocol or Server Message Block protocol, and wherein the first operation set is a Unix operation set or a Windows operation set.

13. The method of claim 12, wherein the first request comprises the first operation, for execution on the source host, to generate the first metadata item.

14. The method of claim 10, wherein identifying the first latency further comprises:
identifying a receive time responsive to the first thread receiving the first response;
subtracting a transmit time from the receive time to generate the first latency; and
storing the first latency in a first sample in a first moving average comprising a first plurality of samples.

15. The method of claim 14, wherein aggregating the samples further comprises:
aggregating the first latency over the first plurality of samples to generate a first average latency of requests;
storing the first average latency of requests in a first sample in a second moving average comprising a second plurality of samples;
aggregating the quantity of requests over the first plurality of samples to generate a first average quantity of requests; and storing the first average quantity of requests in a first sample in the second moving average comprising the second plurality of samples.

16. The method of claim 15, wherein the resizing further comprises:
computing an average latency ratio based on the first average latency of requests and a second average latency of requests; and
computing an average quantity of requests ratio based on the first average quantity of requests and a second average quantity of requests.

17. The method of claim 16, wherein the resizing further comprises:
increasing a size of the thread pool responsive to identifying the average quantity of requests ratio as being greater than the average latency ratio, wherein the increasing the size of the thread pool comprises increasing the size of the thread pool by one thread.

18. The method of claim 16, wherein the resizing further comprises:
decreasing a size of the thread pool responsive to identifying the average quantity of requests ratio as being less than the average latency ratio, wherein the decreasing the size of the thread pool comprises decreasing the thread pool by a percentage of the size of the thread pool, and wherein the percentage is configurable.

19. A machine-storage medium and storing a set of instructions that, when executed by at least one processor, causes a machine to perform operations comprising:
communicating a first request to a source host associated with a file set;
utilizing a first thread of a thread pool to receive a first response corresponding to the first request, the first response comprising a first metadata item;
identifying a first latency based on the first response;
incrementing a quantity of requests based on the first response;
aggregating samples based on the first latency and the quantity of requests;
resizing the thread pool based on the aggregating; and
backing up the file set from the source host based on the first metadata item.

20. The machine-storage medium of claim 19, wherein the instructions, when executed, cause the machine to perform operations further comprising:
executing a job, at a backup host, to back up the file set from the source host responsive to a triggering event, the backing up of the file set comprising fetching metadata from the source host;
identifying, by the at least one processor, a first operation set from a plurality of operation sets responsive to identifying a file sharing protocol being utilized by the backup host and the source host, wherein the first operation set comprises a first operation; and
communicating, in parallel, one or more requests to the source host, the communicating the one or more requests comprising communicating the first request to the source host.

\* \* \* \* \*